(12) United States Patent
Deemer et al.

(10) Patent No.: US 12,217,887 B2
(45) Date of Patent: Feb. 4, 2025

(54) COMPOSITE CONDUCTIVE MATERIALS AND METHODS

(71) Applicant: ADVANCED TECHNOLOGY APPLICATIONS GROUP, INC., Las Cruces, NM (US)

(72) Inventors: Eva Deemer, Las Cruces, NM (US); Joshua Kauffman, Las Cruces, NM (US)

(73) Assignee: Advanced Technology Applications Group, Inc., Las Cruces, NM (US)

( * ) Notice: Subject to any disclaimer, the term of this patent is extended or adjusted under 35 U.S.C. 154(b) by 0 days.

(21) Appl. No.: 17/508,858

(22) Filed: Oct. 22, 2021

(65) Prior Publication Data

US 2022/0130572 A1 Apr. 28, 2022

Related U.S. Application Data

(60) Provisional application No. 63/104,679, filed on Oct. 23, 2020.

(51) Int. Cl.
*H01B 1/00* (2006.01)
*C03C 17/36* (2006.01)
(Continued)

(52) U.S. Cl.
CPC ............ *H01B 5/14* (2013.01); *C03C 17/3634* (2013.01); *C03C 17/3668* (2013.01);
(Continued)

(58) Field of Classification Search
CPC ........................................................ H01B 1/00
See application file for complete search history.

(56) References Cited

U.S. PATENT DOCUMENTS

| 4,518,483 A * | 5/1985 | Dickakian | ............... | C10C 3/002 |
| | | | | 208/22 |
| 8,716,863 B2 * | 5/2014 | Wann | ................ | H01L 23/53276 |
| | | | | 257/478 |

(Continued)

FOREIGN PATENT DOCUMENTS

| KR | 10-2028677 | * 10/2019 |
| WO | WO 2020/145644 | * 7/2020 |

OTHER PUBLICATIONS

Liu, Bo-Tau and Kuo, Han-Lin, "Graphene/silver nanowire sandwich structures for transparent conductive films" Department of Chemical and Materials Engineering, National Yunlin University of Science and Technology, Yunlin 64002, Taiwan, Carbon, vol. 63, Nov. 2013, pp. 390-396, 3 pages.

(Continued)

*Primary Examiner* — Chau N Nguyen
(74) *Attorney, Agent, or Firm* — Berkeley Law & Technology Group, LLP

(57) ABSTRACT

Articles and methods regarding composite conductor materials comprising a first conductive material layer and a first carbonaceous material layer. In certain embodiments, the first carbonaceous material layer comprises an sp2 hybridized carbon compound. In certain embodiments, the electrical conductivity of the composite conductive material can be controlled and exhibits a conductivity at least 1.5% greater than the conductivity of the first conductive material layer alone.

9 Claims, 14 Drawing Sheets

(51) Int. Cl.
*H01B 5/00* (2006.01)
*H01B 5/14* (2006.01)
(52) U.S. Cl.
CPC ....... *H01B 5/002* (2013.01); *C03C 2217/252* (2013.01); *C03C 2217/253* (2013.01); *C03C 2218/116* (2013.01); *C03C 2218/31* (2013.01)

(56) References Cited

U.S. PATENT DOCUMENTS

| | | | |
|---|---|---|---|
| 8,735,895 B2 | 5/2014 | Kim | |
| 8,895,433 B2 | 11/2014 | Bonilla | |
| 9,284,196 B2 | 3/2016 | Lee | |
| 9,477,128 B2 | 10/2016 | Ruoff | |
| 10,190,211 B2 * | 1/2019 | Farquhar | B01L 1/00 |
| 2013/0040520 A1 * | 2/2013 | Bohnert | C01B 32/33 |
| | | | 442/179 |
| 2013/0330620 A1 * | 12/2013 | Nishimura | H01M 4/587 |
| | | | 252/502 |
| 2014/0272199 A1 | 9/2014 | Lin | |
| 2016/0280546 A1 * | 9/2016 | Sandu | C01B 32/18 |
| 2017/0338312 A1 | 11/2017 | Treossi | |
| 2017/0368508 A1 | 12/2017 | Grossman | |
| 2020/0020462 A1 * | 1/2020 | Garrett | C25D 7/06 |
| 2021/0091383 A1 * | 3/2021 | House | H01G 11/28 |
| 2022/0208756 A1 * | 6/2022 | Chi | H01L 21/8249 |
| 2023/0002235 A1 * | 1/2023 | Barbera | C01B 32/21 |
| 2023/0211579 A1 * | 7/2023 | Hu | B32B 21/04 |
| | | | 428/219 |

OTHER PUBLICATIONS

Yadav, Shriniwas and Kaur, Inderpreet, "Low temperature processed graphene thin film transparent electrodes for supercapacitor applications", RSC Adv., 2016,6, 78702-78713, (Submitted Jul. 11, 2016, Accepted Aug. 1, 2016, Published Aug. 2, 2016), 6 pages.

* cited by examiner

COMPOSITE CONDUCTIVE MATERIALS AND METHODS

CROSS-REFERENCE TO RELATED APPLICATION(S)

This application claims priority under 35 U.S.C. § 119(e) to U.S. Provisional Patent Application No. 63/104,679, entitled "COMPOSITE CONDUCTIVE MATERIALS AND METHODS," filed Oct. 23, 2020, naming inventors Eva DEEMER and Joshua KAUFFMAN, which is assigned to the current assignee hereof and incorporated herein by reference in its entirety for all purposes.

FIELD OF THE DISCLOSURE

The disclosure generally relates to articles, systems, and methods regarding conductive materials, particularly composite conductive materials that include $sp^2$ hybridized carbon. In certain embodiments, the composite conductive systems may comprise multi-layer and/or multi-wire structures, as well as, methods for specifically adjusting the properties, including the conductive properties, of the composite conductive materials.

BACKGROUND

Electrical energy systems rely on efficient transmission and storage of electrical energy and can be particularly affected by operational limitations related to size, weight, strength, and durability. Efforts to improve the electrical conductivity of various composite conductor materials continue to have various limitations and drawbacks, such as lack of repeatability, lack of reproducibility, difficulty in scale-up, and the creation of unwanted compounds during production processes, including creation of detrimental compounds and impurities. Therefore, there continues to be a need for improved composite conductor materials and methods.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

SUMMARY

Figure 1:
FIG. 1 is an illustration of a composite conductive material according to an embodiment.

Composite conductive materials and their methods of use, manufacture, and adjustment of properties are described herein. In an embodiment, a composite conductive material comprises: a first conductive material layer; and a first carbonaceous material layer; wherein the carbonaceous material layer is disposed in direct contact with the first conductive material layer, and wherein the composite conductive material has an electrical conductivity that is greater than an electrical conductivity of the first conductive material alone.

In an embodiment, a composite conductive material comprises: a first conductive material layer; a first carbonaceous material layer; and a second conductive material layer, wherein the first carbonaceous material layer is disposed between, and in direct contact with, the first conductive material layer and the second conductive material layer. In an aspect, the composite conductive material may further comprise: a second carbonaceous material layer; and a third conductive material layer, wherein the second carbonaceous material layer is disposed in direct on the second conductive material layer, and wherein the third conductive material layer is disposed in direct contact on the second carbonaceous material layer. In another aspect, the composite conductive material of claim may further comprise: a support substrate, wherein the support substrate is disposed in direct contact with the first conductive layer and opposite the first carbonaceous material layer.

In an embodiment, a method of making a composite conductive material comprises: disposing a first carbonaceous material layer directly onto ("overlying") a first conductive material layer, wherein the first carbonaceous material layer comprises an sp2 hybridized carbon compound.

In an embodiment, a method of controlling the electrical conductivity of a composite conductive material comprises: disposing a first carbonaceous material layer directly onto ("overlying") a first conductive material layer, wherein the first carbonaceous material layer comprises an sp2 hybridized carbon compound, and wherein the composite conductive material has an electrical conductivity that is greater than an electrical conductivity of the first conductive material alone.

In an embodiment, a composite conductive material comprises: a metal-carbon interface comprising a first metal surface and a first carbon surface; wherein the carbon surface is disposed in direct contact with the first metal surface, and wherein the composite conductive material has an electrical conductivity that is greater than an electrical conductivity of the first metal surface alone. In an aspect, the composite conductive material may have an electrical conductivity that is at least 0.5% to not greater than 100% greater than the electrical conductivity of the first metal surface alone. In an aspect, the first carbon surface may comprise an sp$^2$ hybridized carbon compound. In an embodiment, the composite conductive material may further comprise a second metal-carbon interface comprising a second metal surface disposed in direct contact with a second carbon surface. In an aspect, the second carbons surface may comprise an sp$^2$ hybridized carbon compound. In an aspect, the first carbon surface and the second carbon surface may define a layer of the sp$^2$ hybridized carbon compound, disposed between the first metal surface and the second metal surface. In an embodiment, the composite conductive material may further comprise one or more additional metal-carbon interfaces. In an aspect, the metal surface may comprise aluminum, copper, nickel, ITO, or a combination thereof. In an aspect, the sp$^2$ hybridized carbon compound may comprise a reduced graphene, an asphaltene, an aromatic pitch, or a combination thereof.

DETAILED DESCRIPTION

The following description, in combination with the figures, is provided to assist in understanding the teachings disclosed herein. The following discussion will focus on specific implementations and embodiments of the teachings. This discussion is provided to assist in describing the teachings and should not be interpreted as a limitation on the scope or applicability of the teachings.

The term "averaged," when referring to a value, is intended to mean an average, a geometric mean, or a median value. As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but can include other features not expressly listed or inherent to such process, method, article, or apparatus. As used herein, the phrase "consists essentially of" or "consisting essentially of" means that the subject that the phrase describes does not include any other components that substantially affect the property of the subject.

Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Further, references to values stated in ranges include each and every value within that range. When the terms "about" or "approximately" precede a numerical value, such as when describing a numerical range, it is intended that the exact numerical value is also included. For example, a numerical range beginning at "about 25" is intended to also include a range that begins at exactly 25. Moreover, it will be appreciated that references to values stated as "at least about," "greater than," "less than," or "not greater than" can include a range of any minimum or maximum value noted therein.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and can be found in textbooks and other sources within the materials sciences, electrical conductor, and insulator arts.

Present embodiments provide unexpected advantages, properties, benefits, and solutions to problems related to a composite conductive material.

FIG. 1 shows an embodiment of a composite conductive material 100. In an embodiment, the composite conductive material 100 comprises a first conductive material layer 102 and a first carbonaceous material layer 104. In an embodiment, the carbonaceous material layer 104 is disposed in direct contact with the first conductive material layer 102. In a specific embodiment, the composite conductive material 100 has an electrical conductivity that is greater than an electrical conductivity of the first conductive material 102 alone.

Figure 2:
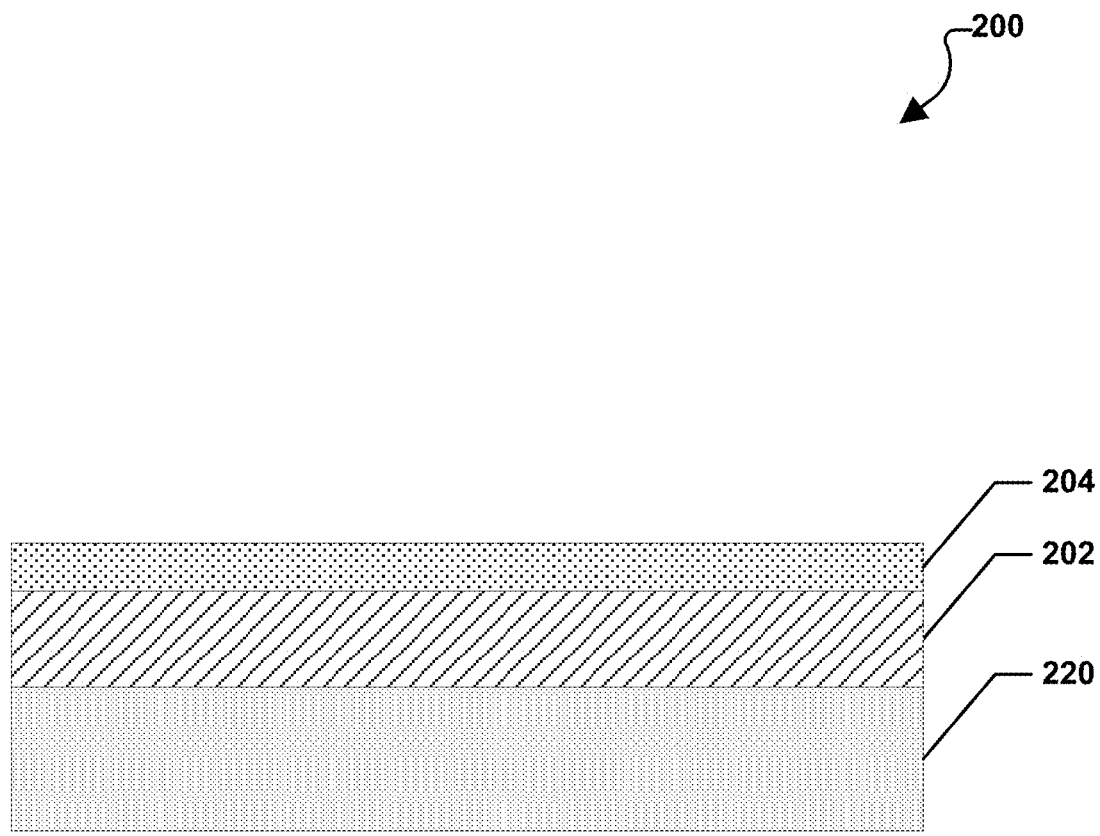
FIG. 2 is an illustration of a composite conductive material according to an embodiment.

FIG. 2 shows an embodiment of a composite conductive material 200. In an embodiment, the composite conductive material 200 comprises a first conductive material layer 202 and a first carbonaceous material layer 204. The carbonaceous material layer 204 is disposed in direct contact with the first conductive material layer 202. In an embodiment, the composite conductive material 200 further comprises a support substrate 220, wherein the support substrate 220 is disposed in direct contact with the first conductive material 202 layer and opposite the first carbonaceous material layer 204. In a specific embodiment, the composite conductive material 200 has an electrical conductivity that is greater than an electrical conductivity of the first conductive material 202 alone.

Figure 3:
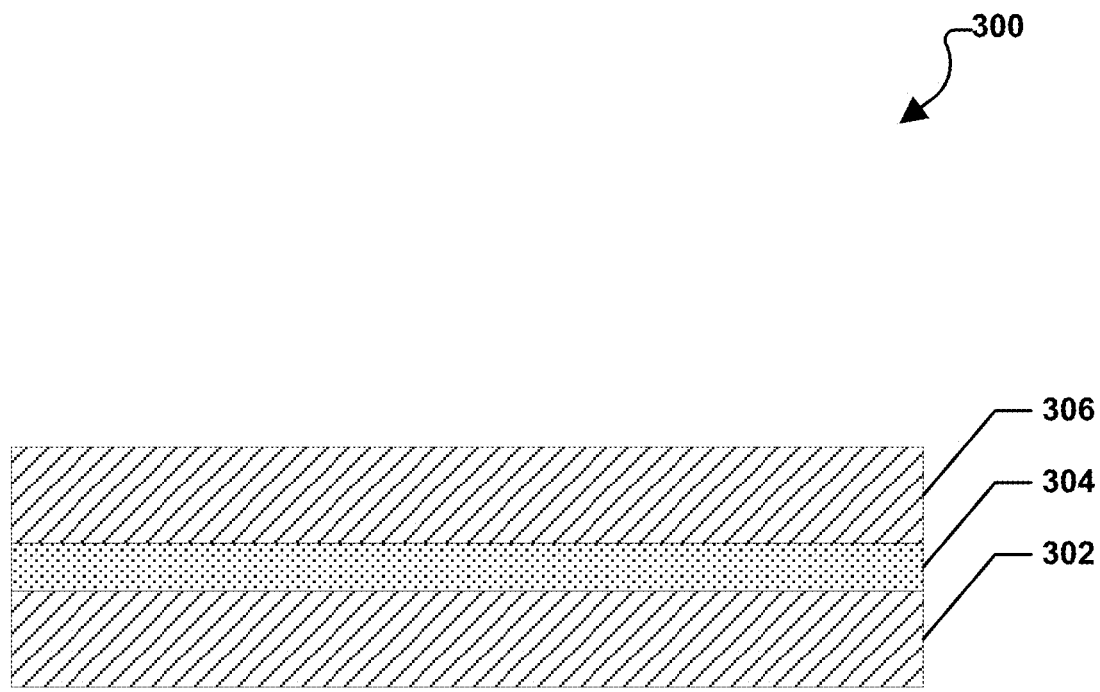
FIG. 3 is an illustration of a composite conductive material according to an embodiment.

FIG. 3 shows an embodiment of a composite conductive material 300. In an embodiment, the composite conductive material 300 comprises a first conductive material layer 302, a first carbonaceous material layer 304, and a second conductive material layer 306. The first carbonaceous material layer 304 is disposed between, and in direct contact with, the first conductive material layer 302 and the second conductive material layer 306. In a specific embodiment, the composite conductive material 300 has an electrical conductivity that is greater than an electrical conductivity of the first conductive material 302 alone.

Figure 4:
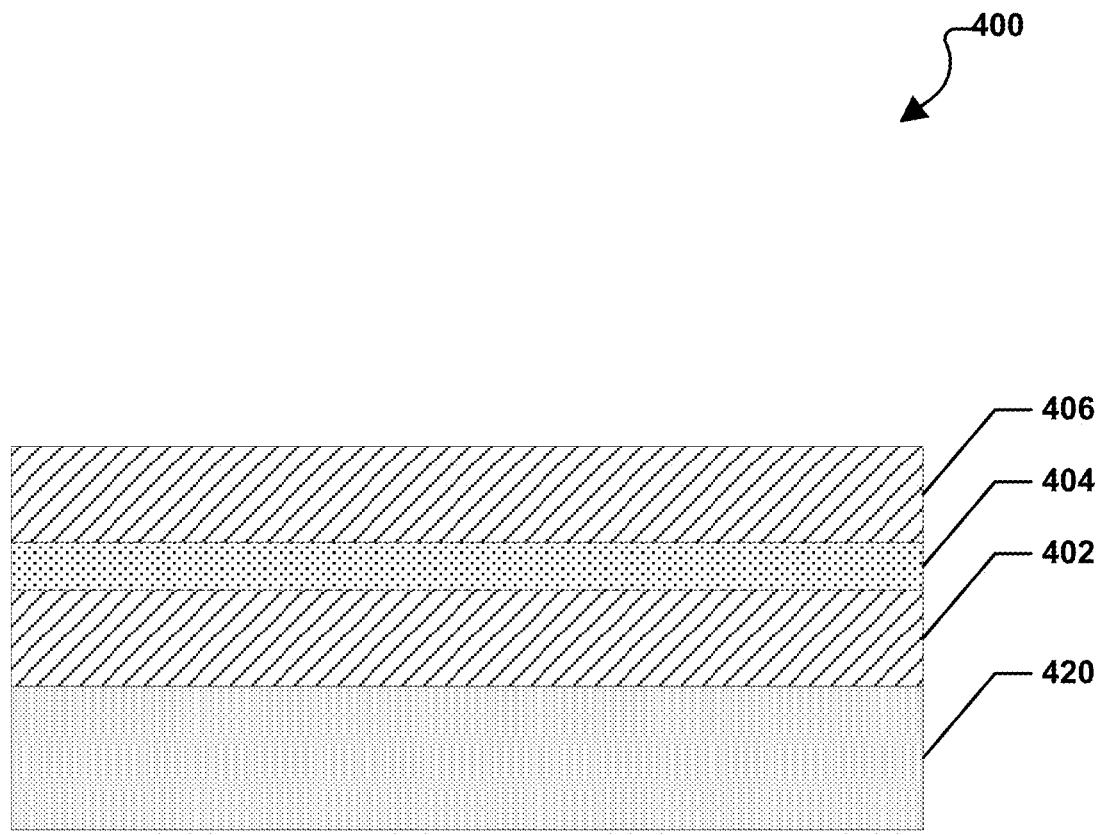
FIG. 4 is an illustration of a composite conductive material according to an embodiment.

FIG. 4 shows an embodiment of a composite conductive material 400. In an embodiment, the composite conductive material 400 comprises a first conductive material layer 402, a first carbonaceous material layer 404, and a second conductive material layer 406. The first carbonaceous material layer 404 is disposed between, and in direct contact with, the first conductive material layer 402 and the second conductive material layer 406. In an embodiment, the composite conductive material 400 further comprises a support substrate 420, wherein the support substrate 420 is disposed in direct contact with the first conductive material 402 layer and opposite the first carbonaceous material layer 404. In a specific embodiment, the composite conductive material 400 has an electrical conductivity that is greater than an electrical conductivity of the first conductive material 402 alone, the second conductive material 406 alone, or a combination thereof.

Figure 5:
FIG. 5 is an illustration of a composite conductive material according to an embodiment.

FIG. 5 shows an embodiment of a composite conductive material 500. In an embodiment, the composite conductive material 500 comprises a first conductive material layer 502, a first carbonaceous material layer 504, and a second conductive material layer 506. The first carbonaceous material layer 504 is disposed between, and in direct contact with, the first conductive material layer 502 and the second conductive material layer 506. In an embodiment, the composite conductive material 500 further comprises a second carbonaceous material layer 508 and a third conductive material layer 508. In an embodiment, the second carbonaceous material layer 506 is disposed in direct contact with (overlying) the second conductive material layer 506 and the third conductive material layer 510 is disposed in direct contact with (on the second carbonaceous material layer 508. In a specific embodiment, the composite conductive material 500 has an electrical conductivity that is greater than an electrical conductivity of the first conductive material 502 alone, the second conductive material 506 alone, the third conductive material 510 alone, or a combination thereof.

Figure 6:
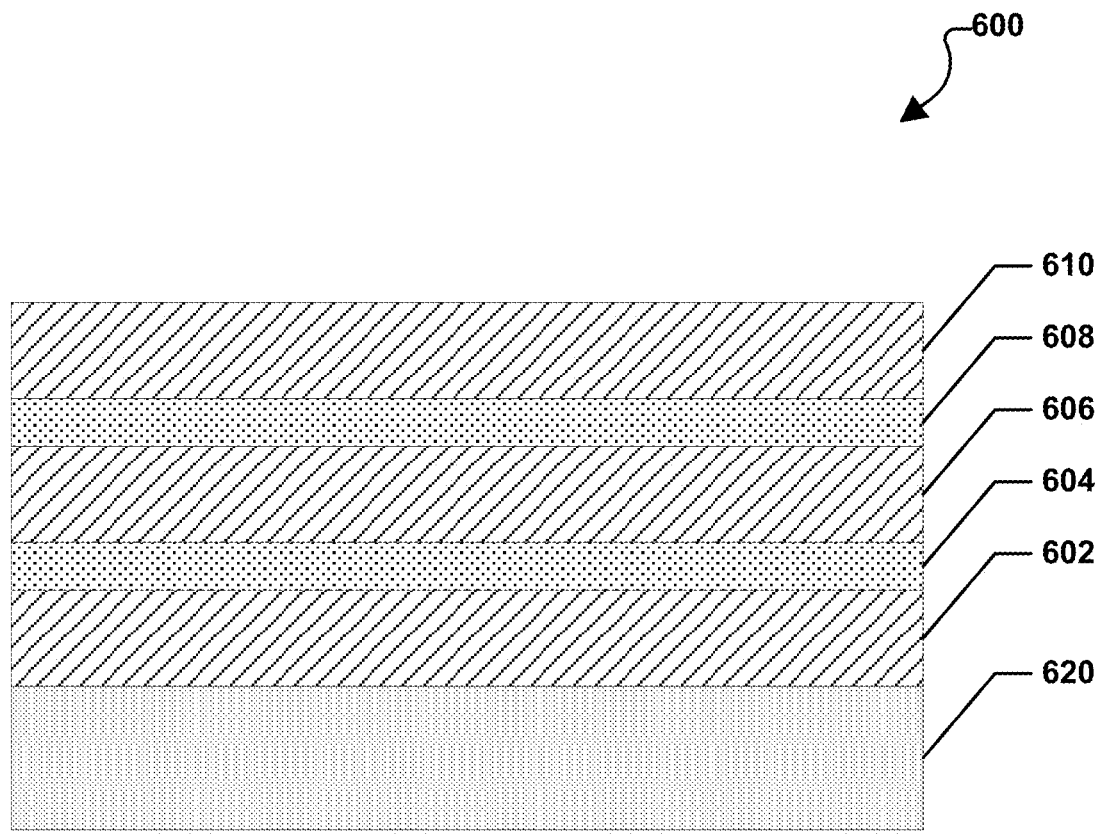
FIG. 6 is an illustration of a composite conductive material according to an embodiment.

FIG. 6 shows an embodiment of a composite conductive material 600. In an embodiment, the composite conductive material 600 comprises a first conductive material layer 602, a first carbonaceous material layer 604, and a second conductive material layer 606. The first carbonaceous material layer 604 is disposed between, and in direct contact with, the first conductive material layer 602 and the second conductive material layer 606. In an embodiment, the composite conductive material 600 further comprises a second carbonaceous material layer 608 and a third conductive material layer 610. In an embodiment, the second carbonaceous material layer 608 is disposed in direct contact with (overlying) the second conductive material layer 606 and the third conductive material layer 610 is disposed in direct contact with (on the second carbonaceous material layer 608. In an embodiment, the composite conductive material 600 further comprises a support substrate 620, wherein the support substrate 620 is disposed in direct contact with the first conductive material 602 layer and opposite the first carbonaceous material layer 604. In a specific embodiment, the composite conductive material 600 has an electrical conductivity that is greater than an electrical conductivity of the first conductive material 602 alone, the second conductive material 606 alone, the third conductive material 610 alone, or a combination thereof.

Figure 7:
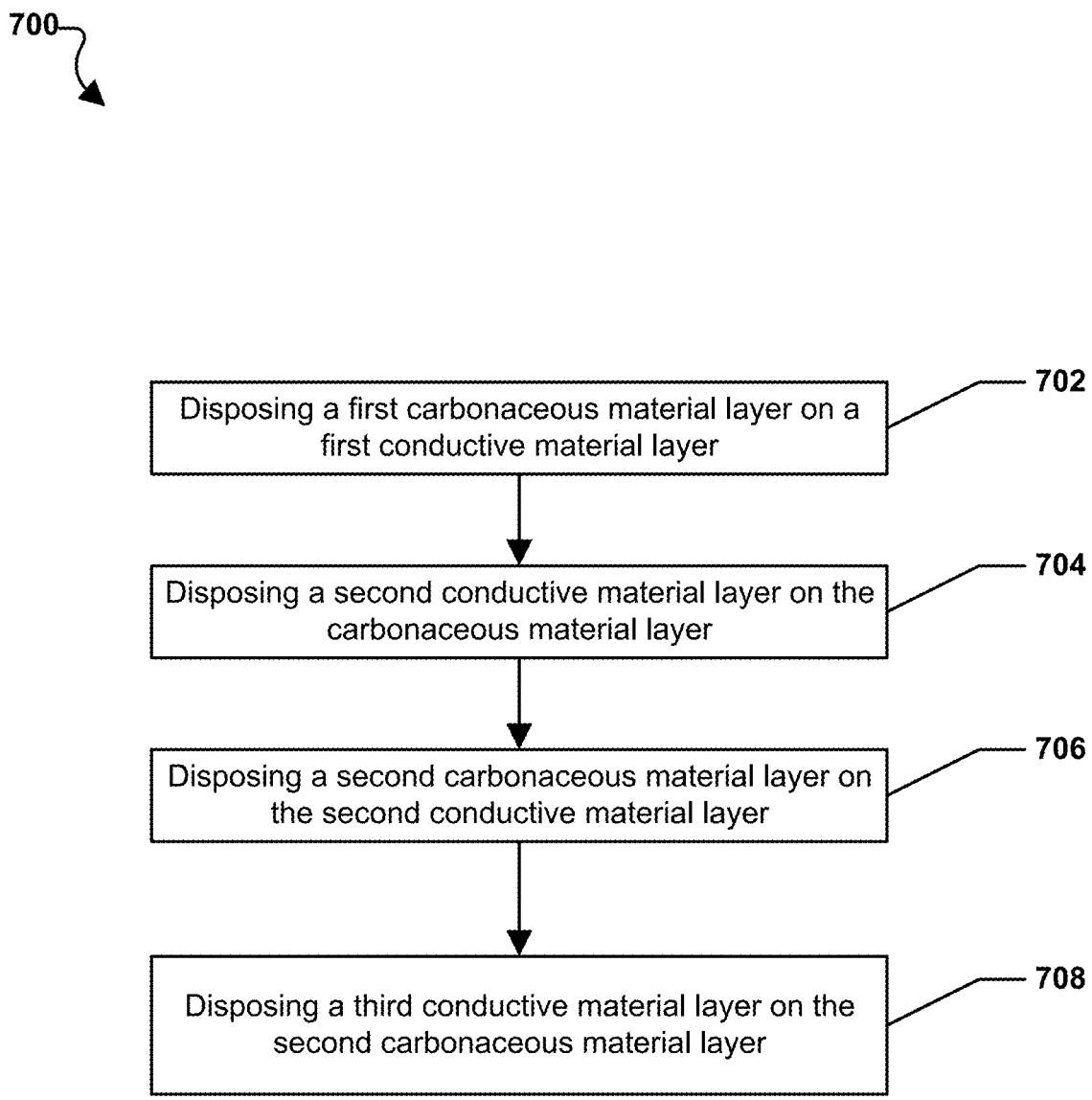
FIG. 7 is an illustration of a process diagram for making a composite conductive material according to an embodiment.

FIG. 7 shows a process diagram of an embodiment of a method 700 of making a composite conductive material. In an embodiment, at step 702, disposing a first carbonaceous material layer on a first conductive material layer occurs. In an embodiment, the first carbonaceous material layer is disposed directly onto (i.e., directly overlying, in direct contact with) the first conductive layer. In a specific embodiment, the first carbonaceous material layer comprises an $sp^2$ hybridized carbon compound. The method may end here, or if desired, one or more additional conductive material layers, carbonaceous material layers, or a combination thereof may be added to form the composite conductive material. In an embodiment, at step 704, disposing a second conductive material layer on the first carbonaceous material layer occurs. At step 706, disposing a second carbonaceous material layer on the second conductive material layer occurs. The second carbonaceous material layer may be the same as or different than the first carbonaceous material layer. In a specific embodiment, the second carbonaceous material layer comprises an $sp^2$ hybridized carbon compound. In an embodiment, at step 708, disposing a third conductive material layer on the second carbonaceous material layer occurs.

Figure 8:
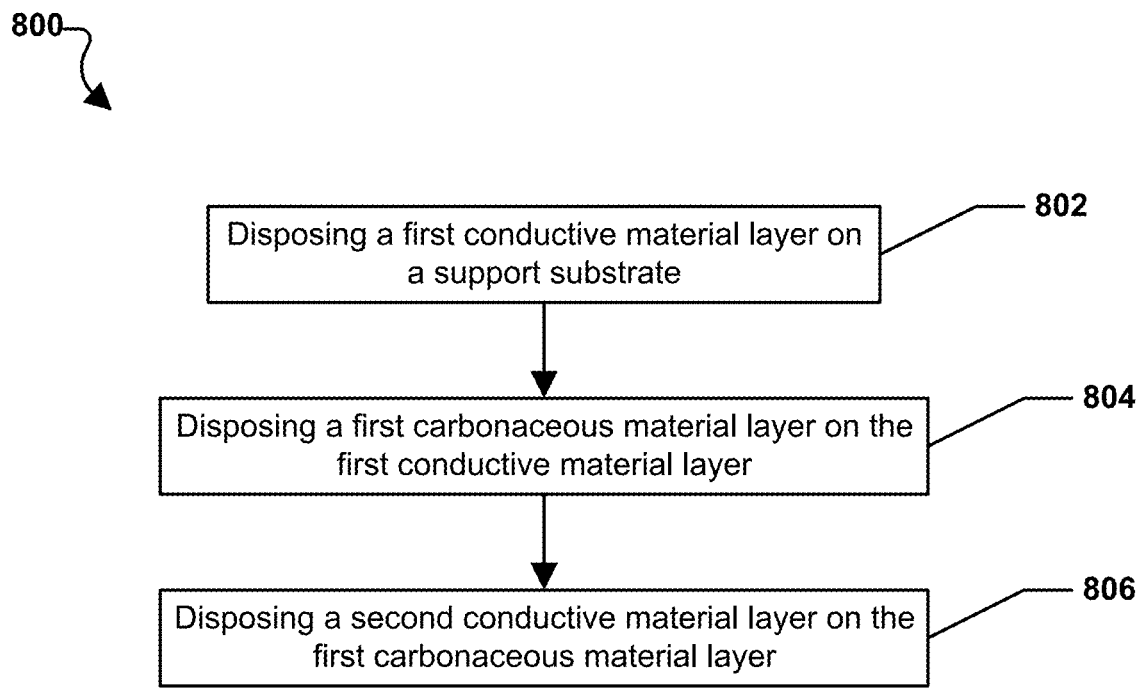
FIG. 8 is an illustration of a process diagram for making a composite conductive material according to an embodiment.

FIG. 8 shows a process diagram of an embodiment of a method 800 of making a composite conductive material. In an embodiment, the composite conductive material may include the addition of one or more support substrates to provide mechanical strength. In an embodiment, at step 802, disposing a first conductive material layer on a support substrate occurs. In an embodiment, the first conductive material layer is disposed directly onto (i.e., directly overlying, in direct contact with) the support substrate. In an embodiment, at step 804, disposing a first carbonaceous material layer on the first conductive material layer occurs. In an embodiment, the first carbonaceous material layer is disposed directly onto (i.e., directly overlying, in direct contact with) the first conductive layer. In a specific embodiment, the first carbonaceous material layer comprises an $sp^2$ hybridized carbon compound. The method may end here, or if desired, one or more additional conductive material layers, carbonaceous material layers, or a combination thereof may be added to form the composite conductive material. In an embodiment, at step 806, disposing a second conductive material layer on the first carbonaceous material layer occurs. The second conductive material layer may be the same as or different than the first conductive material layer.

Figure 9:
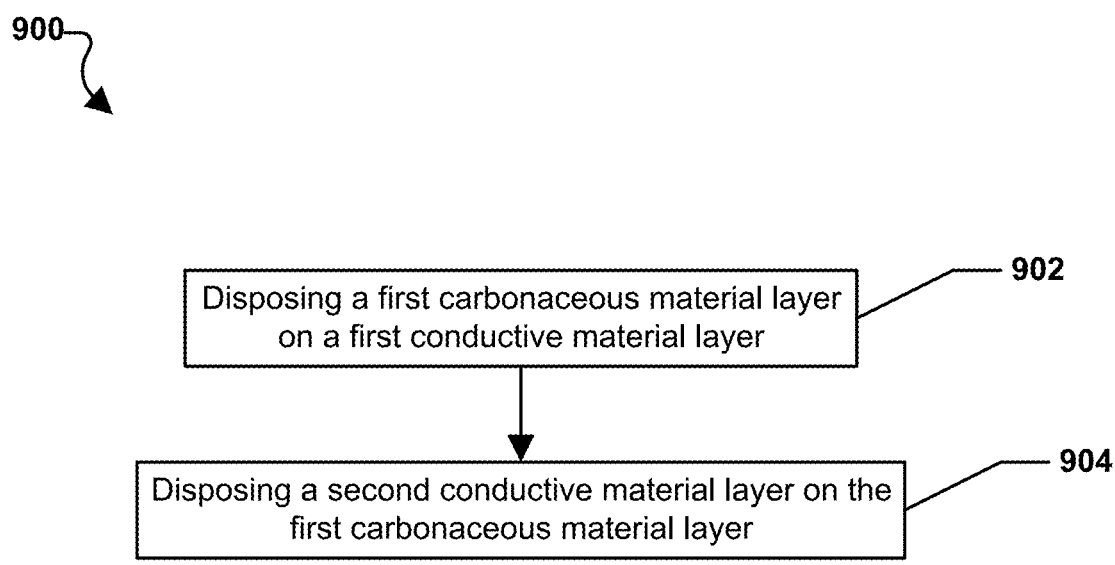
FIG. 9 is an illustration of a process diagram for controlling the electrical conductivity of a composite conductive material according to an embodiment.

FIG. 9 shows a process diagram of an embodiment of a method 900 of controlling the electrical conductivity of a composite conductive material. In an embodiment, the method comprises, at step 902, disposing a first carbonaceous material layer on a first conductive material layer. In an embodiment, the first carbonaceous material layer comprises an sp2 hybridized carbon compound and the composite conductive material layer has an electrical conductivity that is greater than an electrical conductivity of the first conductive material layer alone. In a specific embodiment, the resulting composite conductive material has an electrical conductivity that is at least 1.5% greater than the electrical conductivity of the first conductive material layer alone, such as at least 2.0% greater, at least 2.5% greater, at least 3.0% greater, at least 3.5% greater, at least 4.0% greater, or at least 4.5% greater. The method may end here, or if desired, one or more additional conductive material layers, carbonaceous material layers, or a combination thereof may be added to the composite conductive material. In an embodiment, at step 904, disposing a second conductive material layer directly onto the first carbonaceous material layer occurs. The second conductive material layer may be the same as or different than the first conductive material layer. In an embodiment, the resulting composite conductive material has an electrical conductivity that is at least 5.0% greater than the electrical conductivity of the first conductive material layer alone, the second conductive material layer alone, or a combination thereof.

Figure 12:
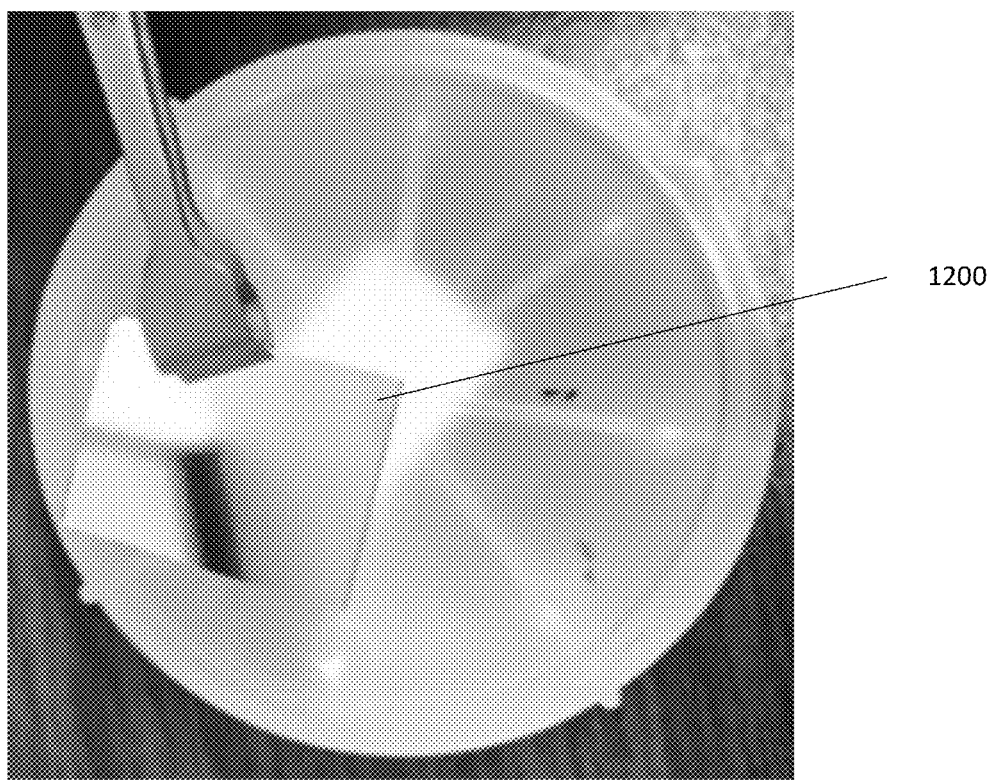
FIG. 12 is an image of a completed composite conductive material according to an embodiment.

FIG. 12 is a photographic image of a completed composite conductive material 1200 according to an embodiment. The image shows an overhead view of the composite conductive material 1200 being held by a pair of tweezers. The completed composite conductive material 1200 has the same general structure as shown in FIG. 4. The composite conductive material 1200 comprises a first conductive material layer of aluminum (not visible), a first carbonaceous material layer of reduced graphene oxide (not visible), and a second conductive material layer of aluminum 1201. The reduced graphene oxide layer is disposed between, and in direct contact with, the first aluminum layer and the second aluminum layer. The composite conductive material 1200 further comprises a support substrate of glass (not visible) disposed in direct contact with the first aluminum layer and opposite the reduced graphene oxide layer.

Composite Conductive Material

As described herein, in an embodiment, a composite conductive material may comprise: a first conductive material layer; and a first carbonaceous material layer; wherein the carbonaceous material layer is disposed in direct contact with the first conductive material layer, and wherein the composite conductive material has an electrical conductivity that is greater than an electrical conductivity of the first conductive material layer alone.

Metal Carbon Interface

As described herein, in an embodiment, a composite conductive material may comprise: a metal-carbon interface comprising a first metal surface and a first carbon surface; wherein the carbon surface is disposed in direct contact with the first metal surface, and wherein the composite conductive material has an electrical conductivity that is greater than an electrical conductivity of the first metal surface alone.

In an embodiment, the composite conductive material may further comprise a second metal-carbon interface comprising a second metal surface disposed in direct contact with a second carbon surface.

In an embodiment, the composite conductive material may further comprise one or more additional metal-carbon interfaces (i.e., third, fourth, fifth, sixth, etc.).

Electrical Conductivity

In an embodiment, the composite conductive material may have a particular electrical conductivity that is greater than the electrical conductivity of the first conductive material alone. In an embodiment, the composite conductive material may have an electrical conductivity that is at least 0.5% greater than the electrical conductivity of the first conductive material alone, such as at least 0.6%, at least 0.7%, at least 0.75%, as at least 0.8%, at least 0.9%, at least 1%, at least at least 1.1%, at least 1.2%, at least 1.3%, at least 1.4%, at least 1.5%, at least 2%, at least 2.5%, at least 3%, at least 3.5%, at least 4%, at least 4.5%, at least 5%, at least 6%, at least 7%, at least 8%, at least 9%, at least 10%, at least 11%, at least 12.5%, at least 15%, at least 18%, at least 20%, at least 21%, at least 22%, at least 25%, at least 27.5%, at least 28%, or at least 28.5% greater than the electrical conductivity of the first conductive material alone. In an embodiment, the composite conductive material may have an electrical conductivity that is not greater than 300% greater than the electrical conductivity of the first conductive material alone, such as not greater than 200%, not greater than 180%, not greater than 175%, not greater than 160%, not greater than 150%, not greater than 140%, not greater than 130%, not greater than 125%, not greater than 120%, not greater than 110%, not greater than 100%, not greater than 90%, not greater than 80%, not greater than 75%, not greater than 65%, not greater than 60%, not greater than 55%, not greater than 50%, not greater than 48%, not greater than 46%, not greater than 44%, not greater than 42%, not greater than 40%, not greater than 38%, not greater than 36%, not greater than 34%, not greater than 32%, or not greater than 30% greater than the electrical conductivity of the first conductive material alone. The electrical conductivity can be within a range comprising any pair of the previous upper and lower limits. In a particular embodiment, the composite conductive material may have a particular electrical conductivity that is greater than the electrical conductivity of the first conductive material alone that is at least 0.5% to 300% greater than the electrical conductivity of the first conductive material alone, such as at least 0.75% to 200% greater than the electrical conductivity of the first conductive material alone, at least 0.8% to 100% greater than the electrical conductivity of the first conductive material alone, at least 0.9% to 80% greater than the electrical conductivity of the first conductive material alone, at least 1.0% to 75% greater than the electrical conductivity of the first conductive material alone, or at least 1.1% to 60% greater than the electrical conductivity of the first conductive material alone.

In an embodiment, the composite conductive material, as well as its constituent conductive materials, namely a first conductive material and/or a second conductive material may have a particular electrical conductivity expressed as percentage of the International Annealed Copper Standard (IACS). As used herein, it will be understood that the standard may be used as a comparative property for specifying the conductivity of other conductive materials. For instance, the conductivity of a particular grade of metal may be expressed as a fraction or a percentage (%) of the IACS, meaning that its electrical conductivity is a % of the copper specified as the IACS standard.

"Sandwich" Structure—Material Layers

As stated herein, in an embodiment, a composite conductive material may have a particular structure comprising a carbonaceous material layer disposed between two conductive material layers. In a specific embodiment, a composite conductive material may comprise: a first conductive material layer; a first carbonaceous material layer; and a second conductive material layer, wherein the first carbonaceous material layer is disposed between, and in direct contact with, the first conductive material layer and the second conductive material layer.

The composite conductive material may further comprise one or more additional conductive material layers, carbonaceous material layers, or a combination thereof. In particular embodiments, the composite conductive material may include an additional carbonaceous material layer, or plurality of carbonaceous materials layers disposed between an additional conductive material layer, or plurality of conductive material layers, or a combination thereof. In an embodiment, the composite conductive material may further comprise: a second carbonaceous material layer; and a third conductive material layer, wherein the second carbonaceous material layer is disposed in direct contact on the second conductive material layer, and wherein the third conductive material layer is disposed in direct contact on the second carbonaceous material layer.

The composite conductive material may further comprise a support substrate or plurality of support substrates. In an embodiment, the conductive material layer, the carbonaceous material layer, or a combination thereof may be disposed on the support substrate. In an embodiment, a support substrate may be disposed between the conductive material layer, the carbonaceous material layer, or a combination thereof. On the other hand, certain embodiments will be self supporting and not include a support substrate. In a specific embodiment, the composite conductive material further comprises: a support substrate, wherein the support substrate is disposed in direct contact with the first conductive layer and opposite the first carbonaceous material layer. In an embodiment, the conductive material layer and the carbonaceous material layer may be stacked on each other, where one of the layers is in direct contact with the support substrate, or alternately both layers may be alongside each other in contact with the support substrate, or a combination thereof.

As described previously herein, in an embodiment, a composite conductive material may comprise: a metal-carbon interface comprising a first metal surface and a first carbon surface; wherein the carbon surface is disposed in direct contact with the first metal surface. In a specific embodiment, the composite conductive material may further comprise a second metal-carbon interface comprising a second metal surface disposed in direct contact with a second carbon surface. In a specific embodiment, the first carbon surface and the second carbon surface may define a layer of an $sp^2$ hybridized carbon compound disposed between the first metal surface and the second metal surface.

Method of Making A Composite Conductive Material

As stated herein, in an embodiment, a method of making a composite conductive material may comprise: disposing a first carbonaceous material layer directly in contact with a first conductive material layer, wherein the first carbonaceous material layer comprises an $sp^2$ hybridized carbon compound. In an embodiment, the method may further comprise: disposing a second conductive material layer directly onto the first carbonaceous material layer. In an embodiment, the method may further comprise: disposing a second carbonaceous material layer directly onto the second conductive material layer, wherein the second carbonaceous material layer comprises an $sp^2$ hybridized carbon compound. In an embodiment, the method may further comprise: disposing a third conductive material layer directly onto the second carbonaceous material layer, opposite the second conductive material layer. In certain embodiments, the method provides for inclusion of a support substrate. In a specific embodiment, the method may further comprise: disposing the first conductive material layer in direct contact with a support substrate prior to disposing the first carbonaceous material layer, wherein the first carbonaceous material layer is disposed opposite the support substrate.

Certain steps of the method of making a composite material may be conducted with respect to particular temperature conditions. In an embodiment, the step of "disposing the first carbonaceous material layer", "disposing the second carbonaceous material layer", or a combination thereof may be conducted at not greater than 450° C., such as not greater than 400° C., not greater than 300° C., not greater than 200° C., not greater than 100° C., not greater than 75° C., not greater than 50° C., or not greater than ambient temperature.

Certain steps of the method of making a composite material may be conducted with respect to particular mixing conditions. In an embodiment, the step of "disposing a first carbonaceous material layer" may comprise applying the $sp^2$ hybridized carbon compound by applying a mixture (which may be a solution, a dispersion, a colloid, or a combination thereof) comprising an $sp^2$ hybridized carbon compound and a liquid onto the first conductive material layer. In an embodiment, the method may further comprise a step of drying (which can include "evaporating") the mixture, such that the $sp^2$ hybridized carbon compound becomes affixed to the first conductive material layer, the liquid is removed, or a combination thereof.

Certain steps of the method of making a composite material may be conducted with respect to the concentration of the mixture. In an embodiment, the mixture may comprise a concentration of $sp^2$ hybridized carbon compound in a range of at 0.01 mg/ml to 10 mg/ml, such as at least 1 micrograms/ml to 1000 micrograms/ml, such as at 5 micrograms/ml to 500 micrograms/ml.

Certain steps of the method of making a composite material may be conducted with respect to the liquid of the mixture. In an embodiment, the liquid may comprise an organic solvent, an aqueous solution including surfactants, or a combination thereof. In an embodiment, an organic solvent may comprise ethanol, isopropanol, N-Methyl Pyrrolidine, cyclobenzene, combinations thereof, and the like. In an embodiment, surfactants may comprise cationic surfactants, non-ionic surfactants, anionic surfactants, polymer surfactants, or combinations thereof. In particular embodiments, surfactants may comprise sodium dodecyl sulfate ("SDS"), polyethylene glycol nonyl phenyl ethers ("Nonoxynols"), or combinations thereof.

Certain steps of the method of making a composite material may be conducted with respect to particular application processes and/or conditions. In an embodiment, the step of "disposing a first carbonaceous material layer" may comprise applying an $sp^2$ hybridized carbon compound by spin coating, drop coating, drop-casting, spray coating, dip coating, ink jet printing, 3D printing ("additive manufacturing"), or a combination thereof. In an embodiment, 3D printing ("additive manufacturing") may comprise a vat photopolymerization, a material jetting, a binder jetting, a powder bed fusion, a material extrusion, a directed energy deposition, a sheet lamination, or a combination thereof.

Method of Controlling Electrical Conductivity of a Composite Conductive Material As described herein, a method of controlling the electrical conductivity of a composite conductive material may comprise: disposing a first carbonaceous material layer directly onto a first conductive material layer, wherein the first carbonaceous material layer comprises an $sp^2$ hybridized carbon compound, and wherein the composite conductive material has an electrical conductivity that is greater than an electrical conductivity of the first conductive material alone.

In an embodiment, the method provides a controlled and reproducible increase to the electrical conductivity. In an embodiment, the method comprises that the composite conductive material has an electrical conductivity that is at least 0.5% greater than the electrical conductivity of the first conductive material alone, such as at least 0.75% greater, at least 0.8% greater, at least 0.9% greater, at least 1.0% greater, at least 1.25% greater, or at least 1.5% greater than the electrical conductivity of the first conductive material alone. The method may comprise further controlling the electrical conductivity of the composite conductive material by disposing additional material layers. In an embodiment, the method may further comprise: disposing a second conductive material layer directly onto the first carbonaceous material layer.

In certain embodiments, the method will produce a greater increase of electrical conductivity. In an embodiment, the method may comprise the composite conductive material having an electrical conductivity that is at least 2.0% greater than the electrical conductivity of the first conductive material alone, such as at least 2.25% greater, at least 2.5% greater, at least 3.0% greater, at least 3.5% greater, at least 4.0% greater, or at least 4.5% greater.

In a particular embodiment, the method may further comprise: disposing a second carbonaceous material layer directly onto the second conductive material layer, wherein the second carbonaceous material layer comprises an $sp^2$ hybridized carbon compound, and disposing a third conductive material layer directly onto ("overlying") the second carbonaceous material layer, opposite the second conductive material layer.

In particular embodiments, the method may comprise the composite conductive material having an electrical conductivity that is at least 5.0% greater than the electrical conductivity of the first conductive material alone, such as at least 5.5% greater, at least 6.0% greater, at least 6.5% greater, at least 7.0% greater, at least 7.5% greater, at least 8.0% greater, at least 8.5% greater, at least 9.0% greater, at least 9.5% greater, at least 10.0% greater, at least 10.5% greater, or at least 11.0% greater.

Certain steps of the method of controlling the electrical conductivity of the composite material may be conducted with respect to particular temperature conditions. In an embodiment, the step of "disposing the first carbonaceous material layer", "disposing the second carbonaceous material layer", or a combination thereof may be conducted at not greater than 450° C., such as not greater than 400° C., not greater than 300° C., not greater than 200° C., not greater than 100° C., not greater than 75° C., not greater than 50° C., or not greater than ambient temperature.

Certain steps of the method of controlling the electrical conductivity of the composite material may be conducted with respect to particular application processes and/or conditions. In an embodiment, the step of "disposing a first carbonaceous material layer" may comprise applying an $sp^2$ hybridized carbon compound by spin coating, drop coating, drop-casting, spray coating, dip coating, ink jet printing, 3D printing ("additive manufacturing"), or a combination thereof. In an embodiment, 3D printing ("additive manufacturing") may comprise a vat photopolymerization, a material jetting, a binder jetting, a powder bed fusion, a material extrusion, a directed energy deposition, a sheet lamination, or a combination thereof.

Certain steps of the method of controlling the electrical conductivity of the composite material may concern the nature of the carbonaceous material. In an embodiment, the first carbonaceous material, the second carbonaceous material, or a combination thereof may comprise a reduced graphene, an asphaltene, an aromatic pitch, or a combination thereof.

Thickness of Carbonaceous Material Layer(s)

In an embodiment, the carbonaceous material layer, or layers, of the composite conductive material may have a particular thickness. In an embodiment, the first carbonaceous material layer may comprise a thickness of at least 0.3 nm, such as at least 0.8 nm, at least 1 nm, at least 1.2 nm, at least 1.7 nm, at least 2 nm, at least 3 nm, at least 4 nm, at least 5 nm, at least 6 nm, at least 7 nm, at least 8 nm, at least 9 nm, at least 10 nanometers, at least 20 nm, at least 30 nanometers, at least 40 nm, or at least 50 nanometers. In an embodiment, the first carbonaceous material layer may comprises a thickness of not greater than 100,000 nm (100 micrometers), such as not greater than 10,000 nanometers (10 micrometers), not greater than 1000 nanometers (1 micrometer), not greater than 900 micrometers, not greater than 800 micrometers, not greater than 700 micrometers, not greater than 600 micrometers, not greater than 500 micrometers, not greater than 400 micrometers, not greater than 300 micrometers, not greater than 200 micrometers, or not greater than 100 micrometers. The thickness can be within a range comprising any pair of the previous upper and lower limits. In a particular embodiment, the first carbonaceous material layer may comprise a thickness of at least 0.3 nm to not greater than 100 micrometers.

In an embodiment, the carbonaceous material layers may have a particular thickness that is the same, or different, or a combination thereof. In a particular embodiment, the thickness of the carbonaceous material layers is the same. In a particular embodiment, the thickness of the carbonaceous material layers is different. In a particular embodiment, the thickness of the carbonaceous material layers is a combination of same and different.

Thickness of Conductive Material Layer(s)

In an embodiment, the conductive material layer, or layers, of the composite conductive material may have a particular thickness. In an embodiment, the first conductive material layer may comprise a thickness of at least 1 nm, such as at least 2 nm, at least 3 nm, at least 4 nm, at least 5 nm, at least 6 nm, at least 7 nm, at least 8 nm, at least 9 nm, at least 10 nanometers, at least 20 nm, at least 30 nanometers, at least 40 nm, or at least 50 nanometers. In an embodiment, the first conductive material layer may comprise a thickness of not greater than 100 cm, such as not greater than 10 cm, not greater than 1 cm, not greater than 900 micrometers, not greater than 800 micrometers, not greater than 700 micrometers, not greater than 600 micrometers, not greater than 500 micrometers, not greater than 400 micrometers, not greater than 300 micrometers, not greater than 200 micrometers, or not greater than 100 micrometers. The thickness can be within a range comprising any pair of the previous upper and lower limits. In a particular embodiment, the first conductive material layer may comprise a thickness of at least 1 nm to not greater than 100 cm.

In an embodiment, the conductive material layers may have a particular thickness that is the same, or different, or a combination thereof. In a particular embodiment, the thickness of the conductive material layers is the same. In a particular embodiment, the thickness of the conductive material layers is different. In a particular embodiment, the thickness of the conductive material layers is a combination of same and different.

Carbonaceous Material

The carbonaceous material of the composite conductive material may have a specific composition. In an embodiment, the carbonaceous material may comprise an $sp^2$ hybridized carbon compound, an $sp^2$ hybridized carbon allotrope, or a combination thereof. The carbonaceous material may further comprise an $sp^3$ hybridized carbon compound, an $sp^3$ hybridized carbon allotrope, or a combination thereof. The carbonaceous material of the composite conductive material may have a specific nanostructure. In an embodiment, the carbonaceous material may comprise a spherical nanostructure, a tubular nanostructure, a sheet-like ("planar") nanostructure, or a combination thereof. The carbonaceous material of the composite conductive material may comprise a specific dimensional allotrope. In an embodiment, the carbonaceous material may comprise a three-dimensional (3D) carbon allotrope (e.g., graphite (3D)), a two-dimensional (2D) carbon allotrope (e.g., graphene (2D)), a one-dimensional carbon allotrope (e.g., carbon nanotube (1D), a zero-dimensional carbon allotrope (OD) (e.g., a Fullerene (OD)), or a combination thereof. In an embodiment, the carbonaceous material may comprise a fullerene, an onion-like carbon, a carbon dot, a graphene dot, a nanotube, a multi-walled nanotube, a carbon nanohorn, a graphene, a carbon nanoribbon, a reduced graphene, a graphitic sheet, a plurality of multilayered graphitic sheets, a graphite, an asphaltene, an aromatic pitch, a mesophase aromatic pitch, or a combination thereof. In a specific embodiment, the carbonaceous material may comprise a reduced graphene, an asphaltene, an aromatic pitch, or a combination thereof.

The composite conductive material may include a specific amount of first carbonaceous material. In an embodiment, the first carbonaceous material may comprise at least 0.005 wt % of the composite conductive material, such as at least 0.01 wt %, at least 0.05 wt %, at least 0.1 wt %, at least 0.5 wt %, at least 1 wt %, at least 5 wt %, at least 10 wt %, at least 15 wt %, at least 20 wt %, at least 25 wt %, at least 30 wt %, at least 35 wt %, at least 40 wt %, at least 45 wt %, or at least 50 wt %. In an embodiment, the first carbonaceous material may comprise not greater than 50 wt % of the composite conductive material, such as not greater than 45 wt %, not greater than 40 wt %, not greater than 35 wt %, not greater than 30 wt %, or not greater than 25 wt %. The amount can be within a range comprising any pair of the previous upper and lower limits. In a particular embodiment, the amount of first carbonaceous material may comprise at least 0.005 wt % to not greater than 50 wt % of the composite conductive material.

The composite conductive material may include a specific amount of total carbonaceous material. The total amount of carbonaceous material will include the amount of all carbonaceous material layers (i.e., the sum of the first carbonaceous material layer and any other carbonaceous material layers that are present). In an embodiment, the total carbonaceous material may comprise at least 0.005 wt % of the composite conductive material, such as at least 0.01 wt %, at least 0.05 wt %, at least 0.1 wt %, at least 0.5 wt %, at least 1 wt %, at least 5 wt %, at least 10 wt %, at least 15 wt %, at least 20 wt %, at least 25 wt %, at least 30 wt %, at least 35 wt %, at least 40 wt %, at least 45 wt %, or at least 50 wt %. In an embodiment, the total carbonaceous material may comprises not greater than 50 wt % of the composite conductive material, such as not greater than 45 wt %, not greater than 40 wt %, not greater than 35 wt %, not greater than 30 wt %, or not greater than 25 wt %. The amount can be within a range comprising any pair of the previous upper and lower limits. In a particular embodiment, the amount of total carbonaceous material may comprise at least 0.005 wt % to not greater than 50 wt % of the composite conductive material.

The first carbonaceous material of the composite conductive material may include a specific amount of a $sp^2$ hybridized carbon compound. In an embodiment, the first carbonaceous material may comprise at least 0.5 wt % of a sp2 hybridized carbon compound, such as at least 1 wt %, at least 5 wt %, at least 10 wt %, at least 15 wt %, at least 20 wt %, at least 25 wt %, at least 30 wt %, at least 35 wt %, at least 40 wt %, at least 45 wt %, or at least 50 wt %, at least 55 wt %, at least 60 wt %, at least 65 wt %, at least at least 70 wt %, or at least 75 wt %. In an embodiment, the first carbonaceous material may comprises not greater than 100 wt % of a sp2 hybridized carbon compound, such as not greater than 95 wt %, not greater than 40 wt %, not greater than 35 wt %, not greater than 30 wt %, or not greater than 25 wt %. The amount can be within a range comprising any pair of the previous upper and lower limits. In a particular embodiment, the amount of first carbonaceous material may comprise at least 0.05 wt % to not greater than 100 wt % of the first carbonaceous material.

The total carbonaceous material of the composite conductive material may include a specific amount of $sp^2$ hybridized carbon compound. The total carbonaceous material will include the amount of all carbonaceous material layers (i.e., the sum of the first carbonaceous material layer and any other carbonaceous material layers that are present). In an embodiment, the total carbonaceous material may comprise at least 0.5 wt % of a sp2 hybridized carbon compound, such as at least 1 wt %, at least 5 wt %, at least 10 wt %, at least 15 wt %, at least 20 wt %, at least 25 wt %, at least 30 wt %, at least 35 wt %, at least 40 wt %, at least 45 wt %, or at least 50 wt %, at least 55 wt %, at least 60 wt %, at least 65 wt %, at least at least 70 wt %, or at least 75 wt %. In an embodiment, the total carbonaceous material may comprises not greater than 100 wt % of a sp2 hybridized carbon compound, such as not greater than 95 wt %, not greater than 40 wt %, not greater than 35 wt %, not greater than 30 wt %, or not greater than 25 wt %. The amount can be within a range comprising any pair of the previous upper and lower limits. In a particular embodiment, the amount of total carbonaceous material may comprise at least 0.05 wt % to not greater than 100 wt % of a sp2 hybridized carbon compound.

Carbon Surfaces In an embodiment, the composite conductive material may include one (i.e., a first) or more (i.e., second, third, fourth, etc.) carbon surfaces. The carbon surfaces may be the same or different with respect to various physical, chemical, electrical, or other properties, or a combination thereof. In an embodiment, a carbon surface may comprise a carbonaceous material as described herein. In a specific embodiment, a first carbon surface may comprise an $sp^2$ hybridized carbon compound. In a specific embodiment, a second carbon surface may comprise an $sp^2$ hybridized carbon compound. In a specific embodiment, the sp2 hybridized carbon compound may comprise a reduced graphene, an asphaltene, an aromatic pitch, or a combination thereof.

Conductive Material

The conductive material of the composite conductive material may have a specific composition. In an embodiment, the first conductive material layer may comprise a metal, an alloy, a conductive polymer, a conductive ceramic, a semi-conductor, or a combination thereof. In an embodiment, the metal may comprise copper, gold, aluminum, nickel, zinc, brass, iron, tin, bronze, lead, steel, combinations thereof, or alloys thereof. In an embodiment, the conductive ceramic may comprise lead oxide (PbO), ruthenium dioxide (RuO2), bismuth ruthenate (Bi2Ru2O7), bismuth iridate (Bi2Ir2O7), or combinations thereof. In an embodiment, the conductive polymer may comprise a poly (acetylene) (PAC), a poly(p-phenylene vinylene) (PPV), a poly(thiophene) (PT), a poly(3,4-ethylenedioxythiophene) (PEDOT), a poly(p-phenylene sulfide) (PPS), a poly(pyrrole) (PPY), a polyanilines (PANI), or a combination thereof. In an embodiment, the semiconductor may comprise diamond, silicon, germanium, tin, selenium, tellurium, or combinations thereof.

The composite conductive material may include a specific amount of first conductive material. In an embodiment, the first conductive material may comprises at least 0.05 wt % of the composite conductive material, such as at least 0.1 wt %, at least 0.5 wt %, at least 1 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least at least 70 wt %, at least at least 75 wt %, at least at least 80 wt %, at least at least 85 wt %, at least at least 90 wt %, at least 95 wt %, or at least at least 99 wt %. In an embodiment, the first conductive material may comprises not greater than 99.95 wt % of the composite conductive material, such as not greater than 99.5 wt %, not greater than 99 wt %, not greater than 95 wt %, not greater than 90 wt %, not greater than 85 wt %, not greater than 80 wt %, not greater than 75 wt %, or not greater than 70 wt %, not greater than 65 wt %, not greater than 60 wt %, not greater than 55 wt %, not greater than 50 wt %. The amount can be within a range comprising any pair of the previous upper and lower limits. In a particular embodiment, the amount of first conductive material may comprise at least 0.05 wt % to not greater than 99.95 wt % of the composite conductive material.

The composite conductive material may include a specific amount of total conductive material. The total amount of conductive material will include the amount of all conductive material layers (i.e., the sum of the first conductive material layer and any other conductive material layers that are present). In an embodiment, the total amount of conductive material may comprises at least 0.05 wt % of the composite conductive material, such as at least 0.1 wt %, at least 0.5 wt %, at least 1 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least at least 70 wt %, at least at least 75 wt %, at least at least 80 wt %, at least at least 85 wt %, at least at least 90 wt %, at least 95 wt %, or at least at least 99 wt %. In an embodiment, the amount of total conductive material may comprises not greater than 99.95 wt % of the composite conductive material, such as not greater than 99.5 wt %, not greater than 99 wt %, not greater than 95 wt %, not greater than 90 wt %, not greater than 85 wt %, not greater than 80 wt %, not greater than 75 wt %, or not greater than 70 wt %, not greater than 65 wt %, not greater than 60 wt %, not greater than 55 wt %, not greater than 50 wt %. The amount can be within a range comprising any pair of the previous upper and lower limits. In a particular embodiment, the amount of total conductive material may comprise at least 0.05 wt % to not greater than 99.95 wt % of the composite conductive material.

Metal Surfaces

As described herein, in an embodiment, the composite conductive material may include one (i.e., a first) or more (i.e., second, third, fourth, etc.) metal surfaces. The metal surfaces may be the same or different with respect to various physical, chemical, electrical, or other properties, or a combination thereof. In an embodiment, a metal surface may comprise a metal as described herein. In a specific embodiment, a metal surface comprises aluminum, copper, nickel, ITO, or a combination thereof.

EMBODIMENTS

Embodiment 1. A composite conductive material comprising: a first conductive material layer; and a first carbonaceous material layer; wherein the carbonaceous material layer is disposed in direct contact with the first conductive material layer, and wherein the composite conductive material has an electrical conductivity that is greater than an electrical conductivity of the first conductive material alone.

Embodiment 2. The composite conductive material of embodiment 1, wherein the composite conductive material has an electrical conductivity that is at least 0.5% greater than the electrical conductivity of the first conductive material alone, such as at least 1%, at least 1.5%, at least 2%, at least 2.5%, at least 3%, at least 3.5%, at least 4%, at least 4.5%, at least 5%, at least 6%, at least 7%, at least 8%, at least 9%, at least 10%, at least 11%, at least 12.5%, at least 15%, at least 18%, at least 20%, at least 21%, at least 22%, at least 25%, at least 27.5%, at least 28%, or at least 28.5% greater than the electrical conductivity of the first conductive material alone.

Embodiment 3. A composite conductive material comprising: a first conductive material layer; a first carbonaceous material layer; and a second conductive material layer, wherein the first carbonaceous material layer is disposed between, and in direct contact with, the first conductive material layer and the second conductive material layer.

Embodiment 4. The composite conductive material of embodiment 3, further comprising: a second carbonaceous material layer; and a third conductive material layer, wherein the second carbonaceous material layer is disposed in direct on the second conductive material layer, and wherein the third conductive material layer is disposed in direct contact on the second carbonaceous material layer.

Embodiment 5. The composite conductive material of embodiment 3, further comprising: a support substrate, wherein the support substrate is disposed in direct contact with the first conductive layer and opposite the first carbonaceous material layer.

Embodiment 6. A method of making a composite conductive material comprising: disposing a first carbonaceous material layer directly onto ("overlying") a first conductive material layer, wherein the first carbonaceous material layer comprises an sp2 hybridized carbon compound.

Embodiment 7. The method of embodiment 6, further comprising: disposing a second conductive material layer directly onto ("overlying") the first carbonaceous material layer.

Embodiment 8. The method of embodiment 7, further comprising: disposing a second carbonaceous material layer directly onto ("overlying") the second conductive material layer, wherein the second carbonaceous material layer comprises an sp2 hybridized carbon compound.

Embodiment 9. The method of embodiment 8, further comprising: disposing a third conductive material layer directly onto ("overlying") the second carbonaceous material layer, opposite the second conductive material layer.

Embodiment 10. The method of embodiment 6, further comprising: disposing the first conductive material layer in direct contact with a support substrate prior to disposing the first carbonaceous material layer, wherein the first carbonaceous material layer is disposed opposite the support substrate.

Embodiment 11. The method of embodiment 6 or 8, wherein "disposing the first carbonaceous material layer", disposing the second carbonaceous material layer, or a combination thereof is conducted at not greater than 350° C., such as not greater than 300° C., not greater than 200° C., not greater than 100° C., or not greater than ambient temperature.

Embodiment 12. The method of embodiment 6, wherein the step of "disposing a first carbonaceous material layer" comprises applying the sp2 hybridized carbon compound by applying a mixture (a solution, a dispersion, a colloid, or a combination thereof) comprising the sp2 hybridized carbon compound and a liquid onto the first conductive material layer.

Embodiment 13. The method of embodiment 6, wherein the step of "disposing a first carbonaceous material layer" comprises applying the sp2 hybridized carbon compound by spin coating, drop coating (drop-casting?), spray coating, dip coating, ink jet printing, 3D printing ("additive manufacturing"), or a combination thereof.

Embodiment 14. The method of embodiment 13, wherein "3D printing" comprises a vat photopolymerization, a material jetting, a binder jetting, a powder bed fusion, a material extrusion, a directed energy deposition, a sheet lamination, or a combination thereof.

Embodiment 15. The method of embodiment 12, further comprising drying ("evaporating") the mixture, whereby the sp2 hybridized carbon compound is affixed to the first conductive material layer, the liquid is removed, or a combination thereof.

Embodiment 16. The method of embodiment 12, wherein the mixture comprises a concentration of sp2 hybridized carbon compound in a range of min. 0.01 mg/ml to max. 10 mg/ml, such as 1 micrograms/ml to 1000 micrograms/ml, such as 5 micrograms/ml to 500 micrograms/ml.

Embodiment 17. The method of embodiment 12, wherein the liquid comprises: an organic solvent, including ethanol, isopropanol, N-Methyl Pyrrolidine, cyclobenzene, or combinations thereof an aqueous solution, including surfactants, such as sodium dodecyl sulfate ("SDS"), polyethylene glycol nonyl phenyl ethers ("Nonoxynols"), or a combination thereof.

Embodiment 18. A method of controlling the electrical conductivity of a composite conductive material comprising: disposing a first carbonaceous material layer directly onto ("overlying") a first conductive material layer, wherein the first carbonaceous material layer comprises an sp2 hybridized carbon compound, and wherein the composite conductive material has an electrical conductivity that is greater than an electrical conductivity of the first conductive material alone.

Embodiment 19. The method of embodiment 18, wherein the composite conductive material has an electrical conductivity that is at least 1.5% greater than the electrical conductivity of the first conductive material alone.

Embodiment 20. The method of embodiment 18, further comprising: disposing a second conductive material layer directly onto ("overlying") the first carbonaceous material layer.

Embodiment 21. The method of embodiment 20, wherein the composite conductive material has an electrical conductivity that is at least 2.0% greater than the electrical conductivity of the first conductive material alone, such as at least 2.0% greater, at least 2.5% greater, at least 3.0% greater, at least 3.5% greater, at least 4.0% greater, or at least 4.5% greater.

Embodiment 22. The method of embodiment 21, further comprising: disposing a second carbonaceous material layer directly onto ("overlying") the second conductive material layer, wherein the second carbonaceous material layer comprises an sp2 hybridized carbon compound, and disposing a third conductive material layer directly onto ("overlying") the second carbonaceous material layer, opposite the second conductive material layer.

Embodiment 23. The method of embodiment 22, wherein the composite conductive material has an electrical conductivity that is at least 5.0% greater than the electrical conductivity of the first conductive material alone, such as at least 5.5% greater, at least 6.0% greater, at least 6.5% greater, at least 7.0% greater, at least 7.5% greater, at least 8.0% greater, at least 8.5% greater, at least 9.0% greater, at least 9.5% greater, at least 10.0% greater, at least 10.5% greater, or at least 11.0% greater.

Embodiment 24. The method of embodiment 18 or 22, wherein "disposing the first carbonaceous material layer", disposing the second carbonaceous material layer, or a combination thereof is conducted at not greater than 350° C., such as not greater than 300° C., not greater than 200° C., not greater than 100° C., or not greater than ambient temperature.

Embodiment 25. The method of embodiment 24, wherein "disposing the first carbonaceous material layer", disposing the second carbonaceous material layer, or a combination thereof comprises spin coating, drop coating (drop-casting?), spray coating, dip coating, ink jet printing, 3D printing ("additive manufacturing"), or a combination thereof.

Embodiment 26. The method of embodiment 25, wherein the first carbonaceous material, the second carbonaceous material, or a combination thereof comprises a reduced graphene, an asphaltene, an aromatic pitch, or a combination thereof.

Embodiment 27. The composite conductive material of embodiment 1 or 3, wherein the first carbonaceous material layer comprises a thickness of at least 0.3 nm, such as at least 0.8 nm, at least 1 nm, at least 1.2 nm, at least 1.7 nm, at least 2 nm, at least 3 nm, at least 4 nm, at least 5 nm, at least 6 nm, at least 7 nm, at least 8 nm, at least 9 nm, at least 10 nanometers, at least 20 nm, at least 30 nanometers, at least 40 nm, or at least 50 nanometers.

Embodiment 28. The composite conductive material of embodiment 1 or 3, wherein the first carbonaceous material layer comprises a thickness of not greater than 100,000 nanometers (100 micrometers), such as not greater than 10,000 nanometers (10 micrometers), not greater than 1000 nanometers (1 micrometer), not greater than 900 nanometers, not greater than 800 nanometers, not greater than 700 nanometers, not greater than 600 nanometers, not greater than 500 nanometers, not greater than 400 nanometers, not greater than 300 nanometers, not greater than 200 nanometers, or not greater than 100 nanometers.

Embodiment 29. The composite conductive material of embodiment 1 or 3, wherein the first conductive material layer comprises a thickness of at least 1 nm, such as at least 2 nm, at least 3 nm, at least 4 nm, at least 5 nm, at least 6 nm, at least 7 nm, at least 8 nm, at least 9 nm, at least 10 nanometers, at least 20 nm, at least 30 nanometers, at least 40 nm, or at least 50 nanometers.

Embodiment 30. The composite conductive material of embodiment 1 or 3, wherein the first conductive material layer comprises a thickness of not greater than 100 cm, such as not greater than 10 cm, not greater than 1 cm, not greater than 900 micrometers, not greater than 800 micrometers, not greater than 700 micrometers, not greater than 600 micrometers, not greater than 500 micrometers, not greater than 400 micrometers, not greater than 300 micrometers, not greater than 200 micrometers, or not greater than 100 micrometers.

Embodiment 31. The composite conductive material of embodiment 1 or 3, wherein the carbonaceous material comprises an sp2 hybridized carbon compound, an sp2 hybridized carbon allotrope, or a combination thereof.

Embodiment 32. The composite conductive material of embodiment 31, wherein the carbonaceous material may further comprise an sp3 hybridized carbon compound, an sp3 hybridized carbon allotrope, or a combination thereof.

Embodiment 33. The composite conductive material of embodiment 31, wherein the carbonaceous material comprises a spherical nanostructure, a tubular nanostructure, a sheet-like ("planar") nanostructure, or a combination thereof.

Embodiment 34. The composite conductive material of embodiment 31, wherein the carbonaceous material comprises a three-dimensional (3D) carbon allotrope (e.g., graphite (3D)), a two-dimensional (2D) carbon allotrope (e.g., graphene (2D)), a one-dimensional carbon allotrope (e.g., carbon nanotube (1D), a zero-dimensional carbon allotrope (0D) (e.g., a Fullerene (0D)), or a combination thereof.

Embodiment 35. The composite conductive material of embodiment 31, wherein the carbonaceous material comprises a fullerene, an onion-like carbon, a carbon dot, a graphene dot, a nanotube, a multi-walled nanotube, a carbon nanohorn, a graphene, a carbon nanoribbon, a reduced graphene, a graphitic sheets, a plurality of multilayered graphitic sheets, graphite, an asphaltene, an aromatic pitch, a mesophase aromatic pitch, or a combination thereof.

Embodiment 36. The composite conductive material of embodiment 35, wherein the carbonaceous material comprises a reduced graphene, an asphaltene, an aromatic pitch, or a combination thereof.

Embodiment 37. The composite conductive material of embodiment 1 or 3, wherein the first conductive material layer comprises a metal, an alloy, a conductive polymer, a conductive ceramic, a semi-conductor, or a combination thereof.

Embodiment 38. The composite conductive material of embodiment 37, wherein the metal comprises copper, gold, aluminum, nickel, zinc, brass, iron, tin, bronze, lead, steel, combinations thereof, or alloys thereof.

Embodiment 39. The composite conductive material of embodiment 37, wherein the conductive ceramic comprises lead oxide (PbO), ruthenium dioxide (RuO2), bismuth ruthenate (Bi2Ru2O7), bismuth iridate (Bi2Ir2O7), or combinations thereof.

Embodiment 40. The composite conductive material of embodiment 37, wherein the conductive polymer comprises a poly(acetylene) (PAC), a poly(p-phenylene vinylene) (PPV), a poly(thiophene) (PT), a poly(3,4-ethylenedioxythiophene) (PEDOT), a poly(p-phenylene sulfide) (PPS), a poly(pyrrole) (PPY), a polyanilines (PANT), or a combination thereof.

Embodiment 41. The composite conductive material of embodiment 37, wherein the semiconductor comprises diamond, silicon, germanium, tin, selenium, tellurium, or combinations thereof.

Embodiment 42. The composite conductive material of embodiment 1 or 3, wherein the conductive material comprises at least 0.005 min. wt % of the composite conductive material, such as at least 1 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least at least 70 wt %, at least at least 75 wt %, at least at least 80 wt %, at least at least 85 wt %, at least at least 90 wt %, at least 95 wt %, or at least at least 99 wt %.

Embodiment 43. The composite conductive material of embodiment 1 or 3, wherein the conductive material comprises not greater than 99.95 max. wt % of the composite conductive material, such as not greater than 99.5 wt %, not greater than 99 wt %, not greater than 95 wt %, not greater than 90 wt %, not greater than 85 wt %, not greater than 80 wt %, not greater than 75 wt %, or not greater than 70 wt %, not greater than 65 wt %, not greater than 60 wt %, not greater than 55 wt %, not greater than 50 wt %, not greater than 95 wt %.

Embodiment 44. The composite conductive material of embodiment 1 or 3, wherein the carbonaceous material comprises at least 0.5-min wt % of the composite conductive material, such as at least 1 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, or at least at least 70 wt %.

Embodiment 45. The composite conductive material of embodiment 1 or 3, wherein the carbonaceous material comprises not greater than 99.5-max. wt % of the composite conductive material, such as not greater than 99 wt %, not greater than 95 wt %, not greater than 90 wt %, not greater than 85 wt %, not greater than 80 wt %, not greater than 75 wt %, not greater than 70 wt %, not greater than 65 wt %, not greater than 60 wt %, not greater than 55 wt %, not greater than 50 wt %, not greater than 45 wt %, not greater than 40 wt %, not greater than 35 wt %, or not greater than 30 wt %.

Embodiment 46. The composite conductive material of embodiment 1 or 3, wherein the carbonaceous material comprises at least 0.5-min. wt % of a sp2 hybridized carbon compound, such as at least 1 wt %, at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least at least 70 wt %, at least 75 wt %.

Embodiment 47. The composite conductive material of embodiment 1 or 3, wherein the carbonaceous material comprises not greater than 100 wt % of an sp2 hybridized carbon compound, such as not greater than than 99 wt %, not greater than 95 wt %, not greater than 90 wt %, not greater than 85 wt %, not greater than 80 wt %, not greater than 75 wt %, or not greater than 70 wt %.

Embodiment 48. A composite conductive material comprising: a metal-carbon interface comprising a first metal surface and a first carbon surface; wherein the carbon surface is disposed in direct contact with the first metal surface, and wherein the composite conductive material has an electrical conductivity that is greater than an electrical conductivity of the first metal surface alone.

Embodiment 49. The composite conductive material of embodiment 48, wherein the composite conductive material has an electrical conductivity that is at least 0.5% to not greater than 100% greater than the electrical conductivity of the first metal surface alone Embodiment 50. The composite conductive material of embodiment 48, wherein the first carbon surface comprises an sp2 hybridized carbon compound.

Embodiment 51. The composite conductive material of embodiment 50, further comprising a second metal-carbon interface comprising a second metal surface disposed in direct contact with a second carbon surface.

Embodiment 52. The composite conductive material of embodiment 51, wherein the second carbons surface comprises an sp2 hybridized carbon compound.

Embodiment 53. The composite conductive material of embodiment 52, wherein the first carbon surface and the second carbon surface define a layer of the sp2 hybridized carbon compound. disposed between the first metal surface and the second metal surface.

Embodiment 54. The composite conductive material of embodiment 53, further comprising one or more additional metal-carbon interfaces.

Embodiment 55. The composite conductive material of embodiment 48, wherein the metal surface comprises aluminum, copper, nickel, ITO, or a combination thereof.

Embodiment 56. The composite conductive material of embodiment 48, wherein the sp2 hybridized carbon compound comprises a reduced graphene, an asphaltene, an aromatic pitch, or a combination thereof.

EXAMPLE

Example 1

Single Interface—Aromatic Pitch (Asphaltene) On Copper Foil

Figure 10:
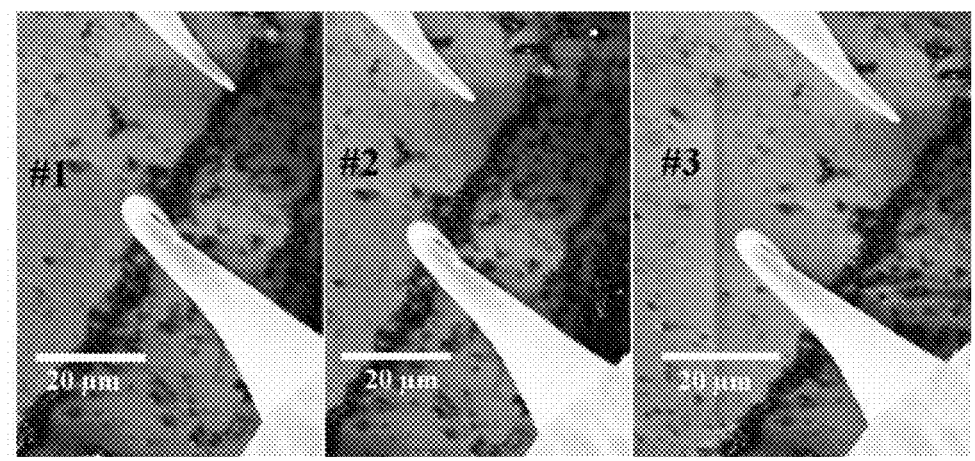
FIG. 10 is an image showing scanning electron micrographs of micro-probe testing of a control embodiment ("#3") and sample embodiments ("#1") and ("#2).
Figure 10:
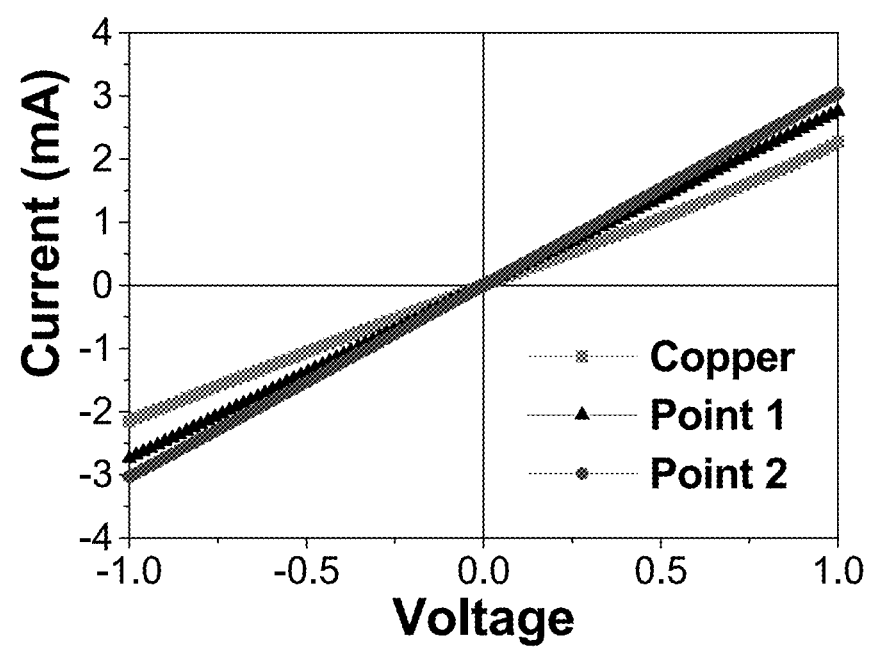

Samples were prepared by applying a layer (line) of aromatic pitch, an $sp^2$ hybridized carbon compound, to a copper foil by drop coating from a dilute solution of aromatic pitch in solvent (5 µg/ml in chlorobenzene). After the solution dried, electrical characterization of the samples was conducted using Scanning Tunneling Microscopy. The tip of a micro-probe was placed as shown in FIG. 10, and sheet resistance was measured. In FIG. 10, the right image labeled "#3" shows both probe tips in contact with the copper foil alone and corresponds to a control sample measuring the sheet resistance (i.e., conductivity) of the copper foil alone. In FIG. 10, the image labeled "#1" shows both probe tips in contact with the layer of aromatic pitch and corresponds to a composite conductive material embodiment, Sample 1. In FIG. 10, the image labeled "#2" shows one probe tip in contact with the copper foil and the other probe tip in contact with the layer of aromatic pitch and corresponds to a composite conductive material embodiment, Sample 2. The test result data is shown below in Table 1.

TABLE 1

Sheet Resistivity-Copper Foil with a Layer of Aromatic Pitch

| Probe position-Sample | Resistivity (Ω m) at 1 V | Decrease in Resistivity (%) |
|---|---|---|
| Point #3-C1 Copper only | 463.5 | — |
| Point #1-S1 | 329.6 | 28.9% |
| Point #2-S2 | 364.6 | 21.3% |

Surprisingly and beneficially, the data shows a measured decrease in sheet resistance at both Point 1 (S1) and Point 2 (S2). Sample S1 corresponds to a 28.9% greater conductivity (i.e., a 28.9% decrease in sheet resistance) compared to the copper alone. Sample S2 corresponds to a 21.3% greater conductivity (i.e., a 21.3% decrease in sheet resistance) than the copper alone.

Example 2

Single Interface—Reduced Graphene Oxide on Indium-Doped Tin Oxide ("ITO")

Figure 11:
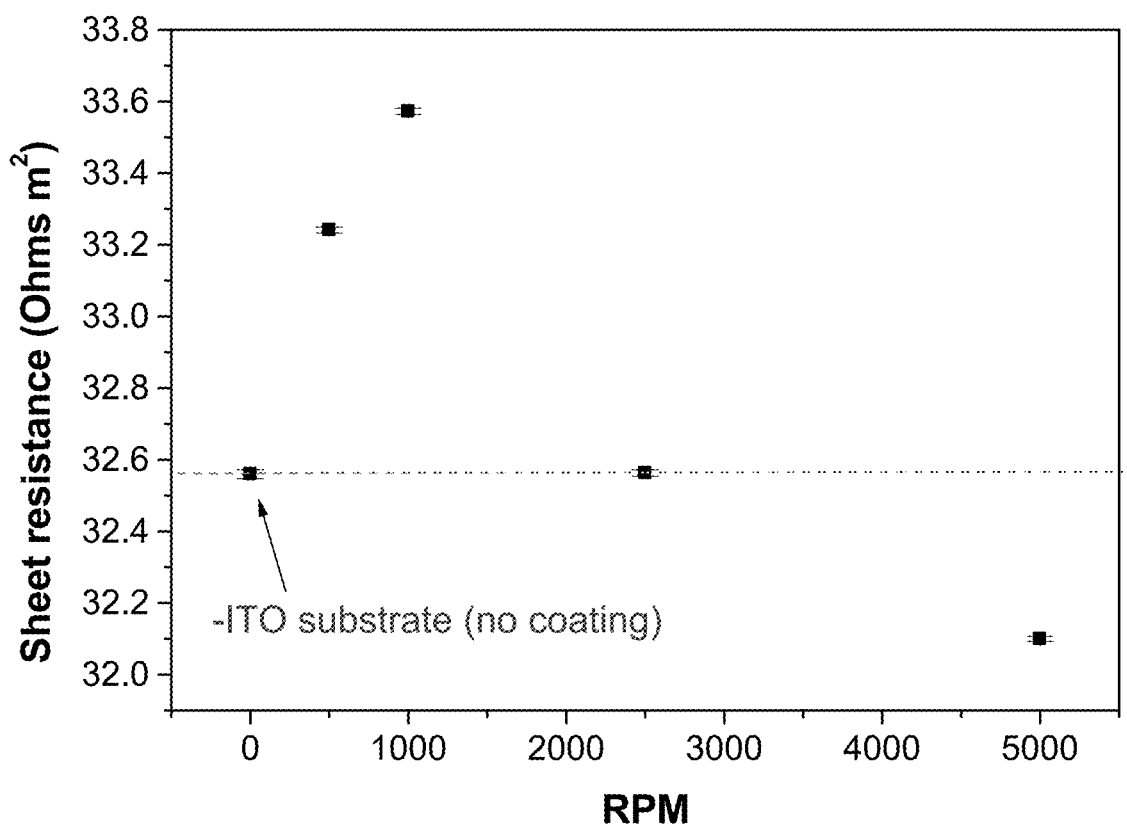
FIG. 11 is an image of a graph of measured sheet resistance versus RPM of spin coating used to produce sample embodiments.

Samples were prepared by applying a solution of reduced graphene oxide (0.5 mg/ml in ethanol) onto indium-doped tin oxide ("ITO") coated glass slides (available from Fischer Scientific). The reduced graphene oxide solution was applied using spin coating and allowed to dry. Different revolutions per minute were used to create samples having varying thickness of reduced graphene oxide. Electrical characterization was taken using 4-point probe methods. The data obtained is shown in FIG. 11 as a graph of measured sheet resistance versus RPM of spin coating.

A control sample (C2) corresponding to the ITO coating alone (no reduced graphene coating) was measured at just under 32.6 Ohm Sample composite conductive embodiments having varying thicknesses of reduced graphene coatings were measured at 500 rpm (sample S3), 1000 rpm (sample S4), 2500 rpm (sample S5), and 5000 rpm (sample S6). Surprisingly, the data showed that the initial composite conductor samples suffered from an unexpected increase in sheet resistance and thus a directly corresponding decrease in electrical conductivity. Sample S3 electrical conductivity was approximately −1.8% compared to the control, sample S4 was approximately −3% compared to the control, and sample S5 was the same as the control. Unexpectedly, it was not until the spin coating rpm exceeded 2500 that the composite conductive material showed an increase in electrical conductivity. Sample S6 showed an unexpected and beneficial increase in electrical conductivity of approximately just over 1.5% at 5000 rpm. Without wishing to be held to any particular theory, it is speculated that the initial sample reduced graphene oxide coatings are too thick at lower rpm and must instead be applied at a sufficiently high rpm to achieve a beneficial coating thickness, where higher rpm is expected to correspond to a progressively thinner reduced graphene coating thickness.

Example 3

Multiple Interfaces—A Single Layer Sandwich of Reduced Graphene Oxide Between Aluminum Composite conductor material samples (S7), having the general bulk layer structure illustrated in FIG. 4, were produced as follows:

3A. Support substrate preparation: Glass substrates were prepared by cutting glass slides having a uniform thickness into 1.5 cm×1.5 cm squares. The square glass substrates were then cleaned by sonicating in soap and water for 15 minutes, then in deionized water for 15 minutes, then in ethanol for 15 minutes, and then in acetone for 15 minutes. The cleaned glass substrates were then dried under a nitrogen atmosphere. The glass substrates are insulators and merely serve as a structural support for the conductive layers of the composite conductor.

3B. First Conductive Material Layer (Aluminum): Aluminum slugs (available from Ted Pella, Inc.) were placed into tungsten evaporation boats (Ted Pella, Inc.) and then into an evaporation source. A 10 nm layer of aluminum was deposited onto the cleaned glass substrates by thermal evaporation performed within an oxygen sensitive glovebox (available from MBraun, Inc.).

3C. Sp2 Carbon Layer (Reduced Graphene Oxide): After deposition of the aluminum layer as described above, a uniform layer of reduced graphene oxide was applied onto the aluminum layer by spin coating. The aluminum coated substrate was placed into a spin coating machine and a solution of reduced graphene oxide (0.5 mg/ml dispersed in ethanol) was applied to the aluminum coated surface and then spun at 1000 RPM to produce a uniform coating of reduced graphene oxide. The reduced graphene coating was allowed to dry completely. The reduced graphene oxide layer had an approximate uniform thickness in a range of 1 nm to 5 nm.

3D. Second Conductive Layer (Aluminum): A 10 nm layer of aluminum was deposited onto the reduced graphene oxide layer by thermal evaporation process as previously described above in 3B to complete samples S7. A completed S7 sample is shown in FIG. 12.

A control sample C3 was prepared having two 10 nm layers of aluminum applied as above, but no reduced graphene oxide layer in between. Electrical characterizations of the control and sample embodiments were taken using a 4-point probe and results are shown in Table 2.

TABLE 2

Aluminum and Single Layer of Reduced Graphene

| Sample | Number of Al Layers | Number of $sp^2$ Carbon Layers | Conductivity (S/m) | Increase Compared to Control |
|---|---|---|---|---|
| C3 | 2 | 0 | 5.00E+06 | — |
| S7 | 2 | 1 | 5.23E+06 | 4.6% |

Surprisingly and beneficially, the sample S7 composite conductive material had a 4.6% increase in conductivity compared to the control C3.

Example 4

Multiple Interfaces—A Double Layer Sandwich of Reduced Graphene Oxide Between Aluminum Composite conductor material samples (S8), having the general bulk layer structure illustrated in FIG. 6, were produced as follows:

4A. A first conductive material layer of aluminum (10 nm), a first Sp2 carbon layer of reduced graphene oxide (1-5 nm), and a second conductive material layer of aluminum (10 nm) were applied to a glass substrate as described above in Example 3.

4B. A second Sp2 carbon layer of reduced graphene oxide (1-5 nm) was applied over the second conductive material layer of aluminum using spin coating as described above in Example 3.

4C. A third conductive material layer of aluminum (10 nm) was applied over the second Sp2 carbon layer of reduced graphene oxide by vapor deposition as described above in Example 3 to complete samples S8. A control sample C4 was prepared having three 10 nm layers of aluminum applied as above, but no reduced graphene oxide layers in between. Electrical characterizations of the control and sample embodiments were taken using a 4-point probe and results are shown in Table 3.

TABLE 3

Aluminum and Two Layers of Reduced Graphene

| Sample | Number of Al Layers | Number of $sp^2$ Carbon Layers | Conductivity (S/m) | Increase Compared to Control |
|---|---|---|---|---|
| C4 | 3 | 0 | 8.91E+06 | — |
| S8 | 3 | 2 | 9.92E+06 | 11.3% |

Surprisingly and beneficially, the sample S8 composite conductive material had an 11.3% increase in conductivity compared to the control C4.

Example 5

Single Interface—Reduced Graphene Oxide on Copper Foil

Figure 13:
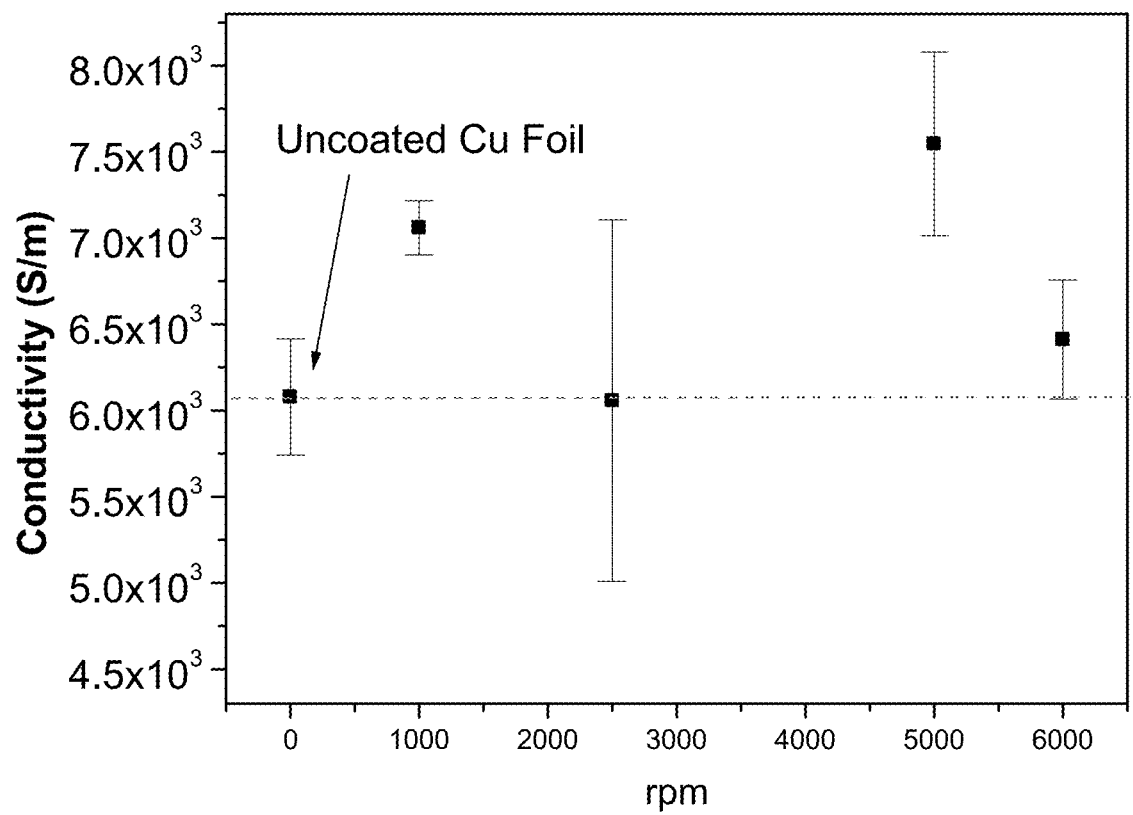
FIG. 13 is an image of a graph of measured conductivity versus RPM of spin coating used to produce sample embodiments.

Composite conductor material samples (S9) having the general bulk layer structure illustrated in FIG. 1 were produced as follows:

Samples were prepared by spin coating a solution of reduced graphene oxide (0.5 mg/ml in ethanol) onto clean copper metal foils. Each copper foil had a thickness of 130 micrometers. Spin coating was conducted at different revolutions per minute (rpm) (1000 rpm, 2500 rpm, 5000 rpm, and 6000 rpm) to create varying thickness of the reduced graphene oxide layer. Spin coating at a higher rpm creates a thinner reduced graphene oxide layer than spin coating at a lower rpm. After spin coating, the reduced graphene oxide solution was allowed to dry. Four samples were created per spin coating speed (i.e., four samples at 1000 rpm, for samples at 2500 rpm, four samples at 5000 rpm, and four samples at 6000 rpm). Electrical characterization was obtained for each of the samples, as well as four control samples (C5) of uncoated copper foil, using 4-point probe methods. The average conductivity data for samples is shown in Table 4 below and in FIG. 13 as a graph of average measured conductivity versus rpm of the spin coating.

TABLE 4

Copper Foil with a Layer of Reduced Graphene Oxide

| Sample | Number of Cu Layers | Number of $sp^2$ Carbon Layers | Conductivity (S/m) (avg.) | Difference Compared to Control |
|---|---|---|---|---|
| C5-Not coated | 1 | 0 | 6078.2 | — |
| S9-1000 rpm | 1 | 1 | 7059.1 | +16.1% |
| S9-2500 rpm | 1 | 1 | 6057.1 | −0.3% |
| S9-5000 rpm | 1 | 1 | 7546.3 | +24.2% |
| S9-6000 rpm | 1 | 1 | 6411.5 | +5.5% |

The average conductivity for the control samples (C5) corresponding to uncoated copper foil alone (no reduced graphene oxide coating) was 6078.2 S/m. Surprisingly, the data showed that the average conductivity for the S9 samples at 1000 rpm, 5000 rpm, and 6000 rpm was beneficially increased compared to the average for the control samples. The avg. sample S9-1000 rpm electrical conductivity was approximately +16.1% compared to the control avg., the avg. sample S9-5000 rpm conductivity was approximately +24.2% compared to the control avg., and the avg. sample S9-6000 rpm conductivity was approximately +5.5% compared to the control avg. Unexpectedly, the avg. sample S9-2500 rpm conductivity was approximately the same as (−0.3%) the control avg. It is unclear why the avg. conductivity for the S9-2500 rpm samples was not as increased as the avg. conductivity of the other S9 samples. Without wishing to be held to any particular theory, it is speculated that, in general, the presence of the reduced graphene coating creates a metal-carbon interface that has a lower resistivity and a higher conductivity than that of the bare metal foil.

Example 6

Single Interface—Reduced Graphene Oxide on Nickel Foil

Figure 14:
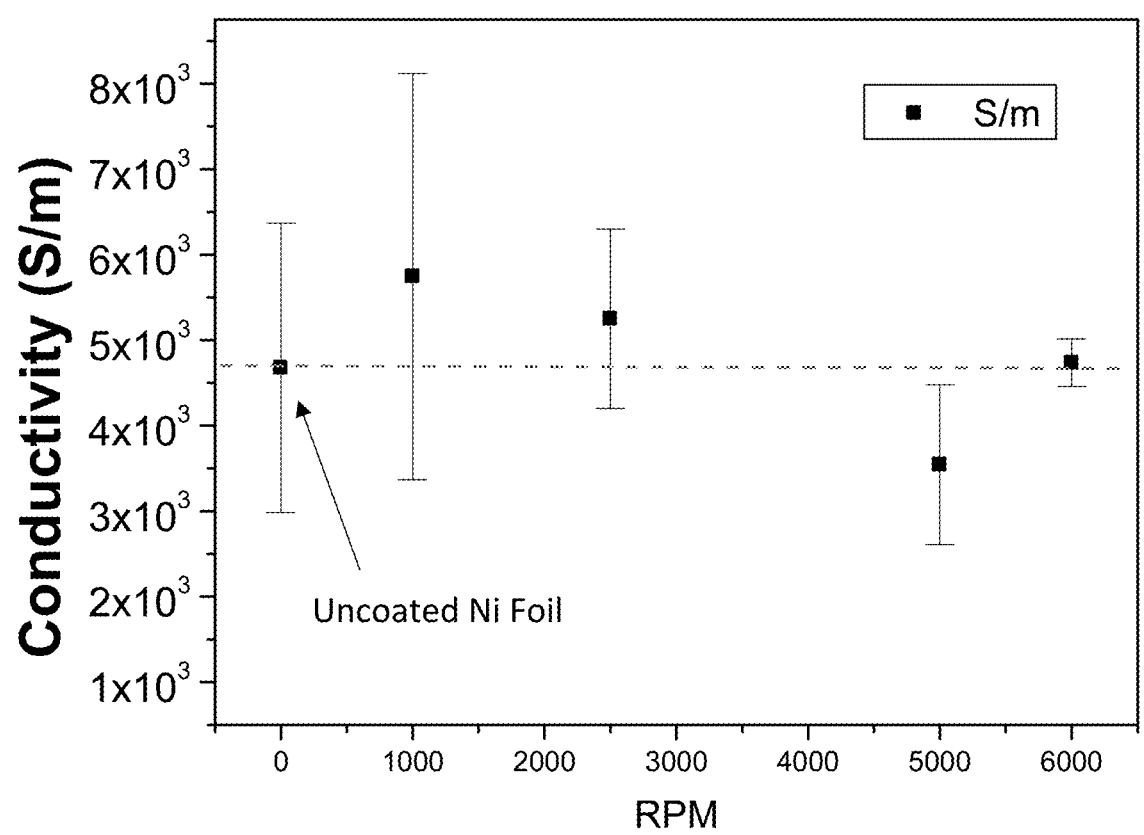
FIG. 14 is an image of a graph of measured conductivity versus RPM of spin coating used to produce sample embodiments.

Composite conductor material samples (S10) having the general bulk layer structure illustrated in FIG. 1 were produced as follows:

Samples were prepared by spin coating a solution of reduced graphene oxide (0.5 mg/ml in ethanol) onto clean nickel metal foils. Each nickel foil had a thickness of 130 micrometers. Spin coating was conducted at different revolutions per minute (rpm) (1000 rpm, 2500 rpm, 5000 rpm, and 6000 rpm) to create varying thickness of the reduced graphene oxide layer. Spin coating at a higher rpm creates a thinner reduced graphene oxide layer than spin coating at a lower rpm. After spin coating, the reduced graphene oxide solution was allowed to dry. Four samples were created per spin coating speed (i.e., four samples at 1000 rpm, for samples at 2500 rpm, four samples at 5000 rpm, and four samples at 6000 rpm). Electrical characterization was obtained for each of the samples, as well as four control samples (C6) of uncoated nickel foil, using 4-point probe methods. The average conductivity data for samples is shown in Table 5 below and in FIG. 14 as a graph of average measured conductivity versus rpm of the spin coating.

TABLE 5

Nickel Foil with a Layer of Reduced Graphene Oxide

| Sample | Number of Ni Layers | Number of sp$^2$ Carbon Layers | Conductivity (S/m) (avg.) | Difference Compared to Control |
|---|---|---|---|---|
| C5-Not coated | 1 | 0 | 4676.2 | — |
| S9-1000 rpm | 1 | 1 | 5744.7 | +22.8% |
| S9-2500 rpm | 1 | 1 | 5250.4 | +12.3% |
| S9-5000 rpm | 1 | 1 | 3542.3 | −24.2% |
| S9-6000 rpm | 1 | 1 | 4735.4 | +1.3% |

The average conductivity for the control samples (C6) corresponding to uncoated nickel foil alone (no reduced graphene oxide coating) was 4676.2 S/m. Surprisingly, the data showed that the average conductivity for the S10 samples at 1000 rpm, 2500 rpm, and 6000 rpm was beneficially increased compared to the average for the control samples. The avg. sample S10-1000 rpm electrical conductivity was approximately +22.8% compared to the control avg., the avg. sample S9-2500 rpm conductivity was approximately +12.3% compared to the control avg., and the avg. sample S9-6000 rpm conductivity was approximately +1.3% compared to the control avg. Unexpectedly, the avg. sample S10-5000 rpm conductivity was −24.2% compared to the control avg. It is unclear why the avg. conductivity for the S10-5000 rpm samples was not increased in the same manner as the other S10 samples. Without wishing to be held to any particular theory, it is speculated that, in general, the presence of the reduced graphene coating creates a metal-carbon interface that has a lower resistivity and a higher conductivity than that of the bare metal foil.

These results demonstrate that a metal-carbon interface results in an improved conductivity and improved carrier transport compared to a blank metal surface and shows that ultraconductive properties for composite conductive materials can be achieved by applying and controlling these metal-carbon interfaces, such as by the number, orientation, and thickness of the sp2 carbon containing layers.

What is claimed is:

1. A composite conductive material comprising:
a first conductive material layer; and
a first carbonaceous material layer;
a second conductive material layer;
a second carbonaceous material layer; and
a third conductive material layer,
wherein the first carbonaceous material layer is disposed between, and in direct contact with the first conductive material layer and the second conductive material layer,
wherein the second carbonaceous material layer is disposed in direct contact on the second conductive material layer,
wherein the third conductive material layer is disposed in direct contact on the second carbonaceous material layer,
wherein the first conductive material layer comprises aluminum, copper, nickel, indium-doped tin oxide, or a combination thereof,
wherein the first carbonaceous material layer comprises a reduced graphene oxide, an asphaltene, an aromatic pitch, or a combination thereof,
wherein the second conductive material layer comprises aluminum, copper, nickel, indium-doped tin oxide, or a combination thereof,
wherein the second carbonaceous material layer comprises a reduced graphene oxide, an asphaltene, an aromatic pitch, or a combination thereof,
wherein the third conductive material layer comprises aluminum, copper, nickel, indium-doped tin oxide, or a combination thereof,
wherein the second carbonaceous material layer comprises a thickness of at least 0.3 nm and not greater than 100 nm,
wherein the third conductive material layer comprises a thickness of at least 1 nm and not greater than 250 nm, and
wherein the composite conductive material has an electrical conductivity that is at least 0.5% greater than an electrical conductivity of the first conductive material layer alone.

2. The composite conductive material of claim 1, wherein the first carbonaceous material layer comprises a thickness of at least 0.3 nm and not greater than 9 nm.

3. The composite conductive material of claim 1, wherein the first conductive material layer comprises a thickness of at least 1 nm and not greater than 250 nm.

4. The composite conductive material of claim 1, wherein the composite conductive material has an electrical conductivity that is at least 1.0% to not greater than 100% greater than the electrical conductivity of the first conductive material layer alone.

5. The composite conductive material of claim 1, wherein the reduced graphene oxide, the asphaltene, the aromatic pitch, or the combination thereof alone comprise an electrical conductivity that is less than the electrical conductivity of the first conductive material layer alone.

6. The composite conductive material of claim 1, wherein the first carbonaceous material layer comprises the asphaltene, the aromatic pitch, or the combination thereof.

7. The composite conductive material of claim 1, wherein the second conductive material layer comprises a thickness of at least 1 nm and not greater than 250 nm.

8. The composite conductive material of claim 1, wherein the first conductive material layer comprises the copper, and the second conductive material layer comprises the copper.

9. The composite conductive material of claim 1, wherein the first conductive material layer comprises the aluminum, the second conductive material layer comprises the aluminum, and the third conductive material layer comprises the aluminum.

* * * * *